(12) United States Patent
Takanokura et al.

(10) Patent No.: US 9,039,188 B2
(45) Date of Patent: May 26, 2015

(54) ILLUMINATION DEVICE, PROJECTION DEVICE, AND PROJECTION-TYPE IMAGE DISPLAY DEVICE

(75) Inventors: Tomoe Takanokura, Katsushika-Ku (JP); Kazutoshi Ishida, Saitama (JP); Makio Kurashige, Kashiwa (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 260 days.

(21) Appl. No.: 13/821,754
(22) PCT Filed: Sep. 8, 2011
(86) PCT No.: PCT/JP2011/070529
§ 371 (c)(1),
(2), (4) Date: Mar. 8, 2013
(87) PCT Pub. No.: WO2012/033179
PCT Pub. Date: Mar. 15, 2012

(65) Prior Publication Data
US 2013/0169940 A1    Jul. 4, 2013

(30) Foreign Application Priority Data
Sep. 8, 2010 (JP) .................................. 2010-201414

(51) Int. Cl.
*G03H 1/02* (2006.01)
*G03B 21/14* (2006.01)
(Continued)

(52) U.S. Cl.
CPC .............. *G02B 27/0944* (2013.01); *H04N 5/89* (2013.01); *G03B 33/12* (2013.01); *G03B 21/28* (2013.01);
(Continued)

(58) Field of Classification Search
CPC ............. G02B 17/004; G02B 26/0808; G02B 27/0905; G02B 27/0933; G02B 27/0944; G02B 27/1046; G02B 27/1093; G02B 27/145; G02B 27/48; G02B 26/101; G02B 5/0236; G02B 2027/0174; G02B 5/0254; G02B 5/203; G02B 6/4204; G02B 26/106; G02B 2027/0105; H04N 9/3161; H04N 9/3129; H04N 1/1265; H04N 5/89; G03B 21/2033
USPC ....................... 353/31, 98; 359/9, 11; 382/210
See application file for complete search history.

(56) References Cited

U.S. PATENT DOCUMENTS 5,132,811 A * 7/1992 Iwaki et al. ........................ 359/6
(Continued)

FOREIGN PATENT DOCUMENTS

JP             06-208089 A1      7/1994
(Continued)

OTHER PUBLICATIONS

Joseph W. Goodman, "Speckle Phenomena in Optics Theory and Applications," Chapter 6, Speckle in Certain Imaging Applications, Roberts & Co., 2006, pp. 187-233.
(Continued)

*Primary Examiner* — Toan Ton
*Assistant Examiner* — Magda Cruz
(74) *Attorney, Agent, or Firm* — Burr & Brown, PLLC

(57) ABSTRACT

Provided is an illumination device which illuminates an illuminated zone with a plurality of coherent light beams having mutually different wavelength ranges, so that it is possible to allow speckles to be inconspicuous. A illumination device is configured to include an optical element including a hologram recording medium and an irradiation device which illuminates the optical element with a plurality of coherent light beams having mutually different wavelength ranges so as to allow a first and second coherent light beams having different wavelength ranges to scan the hologram recording medium of the optical element. The first coherent light beams incident on respective positions of the hologram recording medium are allowed to reproduce an image superimposed on an illuminated zone, and the second coherent light beams incident on the respective positions of the hologram recording medium are allowed to reproduce an image superimposed on the illuminated zone.

12 Claims, 9 Drawing Sheets

(51) Int. Cl.
*G03H 1/32* (2006.01)
*H04N 5/89* (2006.01)
*G03B 33/12* (2006.01)
*G03B 21/28* (2006.01)
*G02B 27/09* (2006.01)
*H04N 9/31* (2006.01)
*G02B 27/48* (2006.01)
*G03B 21/20* (2006.01)
*G03B 33/06* (2006.01)
*G02B 5/18* (2006.01)
*G02B 5/32* (2006.01)
*G02B 26/10* (2006.01)
*G03H 1/22* (2006.01)

(52) U.S. Cl.
CPC .............. *G03B 21/14* (2013.01); *H04N 9/3111* (2013.01); *H04N 9/3161* (2013.01); *G03H 1/02* (2013.01); *H04N 9/3129* (2013.01); *G02B 27/48* (2013.01); *G03B 21/208* (2013.01); *G03B 33/06* (2013.01); *G02B 5/1842* (2013.01); *G02B 5/32* (2013.01); *G02B 26/105* (2013.01); *G03H 1/32* (2013.01); *G03H 2001/2292* (2013.01)

(56) References Cited

U.S. PATENT DOCUMENTS

| | | |
|---|---|---|
| 5,313,479 A | 5/1994 | Florence |
| 2003/0179423 A1 | 9/2003 | Endo et al. |
| 2006/0028961 A1 | 2/2006 | Kim et al. |
| 2008/0247022 A1 | 10/2008 | Yamauchi et al. |
| 2010/0053565 A1 | 3/2010 | Mizushima et al. |
| 2012/0155079 A1* | 6/2012 | Miura ............................ 362/235 |

FOREIGN PATENT DOCUMENTS

| | | |
|---|---|---|
| JP | 2000-019641 A1 | 1/2000 |
| JP | 2003-248194 A1 | 9/2003 |
| JP | 2004-184821 A1 | 7/2004 |
| JP | 2004-264512 A1 | 9/2004 |
| JP | 2006-048049 A1 | 2/2006 |
| JP | 2008-212444 A1 | 9/2008 |
| JP | 2008-256824 A1 | 10/2008 |
| JP | 2009-186647 A1 | 8/2009 |
| WO | 01/81996 A1 | 11/2001 |
| WO | 2008/114502 A1 | 9/2008 |

OTHER PUBLICATIONS

International Search Report dated Oct. 11, 2011 (with English translation).
International Preliminary Report on Patentability dated Nov. 1, 2012.

* cited by examiner

ILLUMINATION DEVICE, PROJECTION DEVICE, AND PROJECTION-TYPE IMAGE DISPLAY DEVICE

TECHNICAL FIELD

The present invention relates to an illumination device which illuminates an illuminated zone with a coherent light beam, a projection device which projects a coherent light beam, a projection-type image display device which displays an image by using a coherent light beam, and more particularly, an illumination device, a projection device, and a projection-type image display device capable of allowing occurrence of speckles to be inconspicuous.

BACKGROUND ART

A projection-type image display device including a screen and a projection device which projects an image light beam on the screen has been widely used. In a typical projection-type image display device, a two-dimensional image as a original image is generated by using a spatial light modulator such as a liquid crystal micro display or a DMD (digital micromirror device), and the two-dimensional image is magnified and projected on a screen by using a projection optical system, so that an image is displayed on the screen.

As the projection device, various types including a commercialized product called an "optical type projector" have been proposed. In a general optical type projector, the spatial light modulator such as a liquid crystal display is illuminated by using an illumination device including a white light source such as a high pressure mercury lamp, and an obtained modulation image is magnified and projected on the screen by using lenses. For example, JP2004-264512A discloses a technique where a white light beam generated by a supper-high pressure mercury lamp is divided into three primary color components R, G, and B by a dichroic mirror, the light beams are guided to spatial light modulators corresponding to the primary colors, generated modulation images corresponding to the primary colors are combined by a cross dichroic prism to be projected on the screen.

However, a high intensity discharge lamp such as a high pressure mercury lamp has a relatively short lifecycle, and in the case where the lamp is used for an optical type projector or the like, the lamp needs to be frequently replaced. In addition, since a relatively large optical system such as a dichroic mirror is needed in order to extract the light beams of the primary color components, there is a problem in that the size of the whole device becomes large.

In order to cope with this problem, a type using a coherent light source such as a laser is also proposed. For example, a semiconductor laser which is widely used in industries has a very long lifecycle in comparison with the high intensity discharge lamp such as a high pressure mercury lamp. In addition, since the laser source is a light source capable of generating light having a single wavelength, a spectroscopic device such as a dichroic mirror is unnecessary, so that there is an advantage in that the whole device can be miniaturized.

On the other hand, in the type using the coherent light source such as a laser source, there is another problem in that speckles occur. The speckle is a punctate pattern which occurs when the coherent light beam such as a laser beam is irradiated on a scattering surface. If the speckle occurs on the screen, it is observed as punctate luminance unevenness (brightness unevenness), so that it becomes a factor of exerting physiological bad influence on the observer. The reason why the speckles occur in the case of using the coherent light beam is that the coherent light beams reflected from portions of the scattering reflection surface such as a screen have very high coherency, and the speckles are generated through interference therebetween. For example, in a literature "Speckle Phenomena in Optics, Joseph W. Goodman, Roberts & Co. 2006", theoretical review of the occurrence of speckles is made in detail.

In the type of using the coherent light source, since there is an intrinsic problem in that the speckles occur, techniques for suppressing the occurrence of speckles have been proposed. For example, JP6-208089A discloses a technique where a scattering plate is irradiated with a laser beam, an obtained scattered light beam is guided to a spatial light modulator, and the scattering plate is driven to rotate by a motor, so that speckles are reduced.

With respect to the projection device and the projection-type image display device using the coherent light source, the techniques for reducing speckles, which have been proposed up to now as described above, may not effectively and sufficiently suppress the speckles. For example, in the method disclosed in JP6-208089A described above, since the laser beams irradiated on the scattering plate are scattered, a portion of the laser beams are lost without contribution to image display. In addition, although the scattering plate needs to be rotated in order to reduce the speckles, the mechanical rotation mechanism becomes a relatively large device, and the power consumption is increased. Moreover, although the scattering plate is rotated, the position of the optical axis of the illumination light beam is not changed, so that the speckles occurring on the screen due to the diffusion may not be sufficiently suppressed.

In addition, the problem of speckles is not a problem peculiar to only the projection device or the projection-type image display device, but the speckles cause a problem in various devices combined with an illumination device which illuminates an illuminated zone with a coherent light beam. For example, a scanner which reads out image information is combined with an illumination device which illuminates a read object. In the case where speckles occur due to a light beam which is illuminated on the read object, the image information may not accurately read. In order to prevent this problem, in a scanner using a coherent light beam, a special process such as image correction needs to be performed.

The coherent light beam generated from a single light source is typically a monochromatic light beam as tipified by a laser beam. In addition, the coherent light beam which is generated by a practically available light source is limited to a light beam having a specific wavelength (range). On the other hand, at present, in many cases, it is preferred that the illuminated zone is illuminated or an image is displayed in desired color, in plural colors, typically in full color which may not be displayed by the single light source. Therefore, at present, it is preferred that, in order to be adapted to various uses, the illumination device, the projection device, and projection-type display device which are actually developed be appropriately adapted to illuminating the illuminated zone with a plurality of coherent light beams having mutually different wavelength ranges or to displaying an image by using a plurality of coherent light beams having mutually different wavelength ranges.

DISCLOSURE OF INVENTION

In order to solve the above-described problem, an object of the present invention is to provide an illumination device which illuminates an illuminated zone with a plurality of coherent light beams having mutually different wavelength ranges, capable of allowing speckles to be inconspicuous, and to provide a projection device and a projection-type image display device configured to include the illumination device.

According to the present invention, there is provided a first illumination device including: an optical element including a hologram recording medium which can reproduce an image of a scattering plate by using a first coherent light beam having a first wavelength range as a reproduction illumination light beam and can reproduce the image of the scattering plate by using a second coherent light beam having a second wavelength range different from the first wavelength range as a reproduction illumination light beam; and an irradiation device configured to irradiate the optical element with a plurality of coherent light beams having different wavelength ranges so that the first coherent light beam and the second coherent light beam are allowed to scan the hologram recording medium, in which the irradiation device and he optical element are arranged such that the first coherent light beams incident from the irradiation device on the respective positions of the hologram recording medium are allowed to reproduce an image superimposed on an illuminated zone and such that the second coherent light beams incident from the irradiation device on the respective positions of the hologram recording medium are allowed to reproduce an image superimposed on the illuminated zone.

In the first illumination device according to the present invention, the hologram recording medium may reproduce the image of the scattering plate by using a third coherent light beam having a third wavelength range different from both of the first wavelength range and the second wavelength range as a reproduction illumination light beam, the coherent light beams having different wavelength ranges irradiated from the irradiation device may further include the third coherent light beam, the irradiation device and the optical element may be arranged such that the third coherent light beams incident from the irradiation device on the respective positions of the hologram recording medium are allowed to reproduce the image superimposed on the illuminated zone, and the first wavelength range may correspond to a first primary color component, the second wavelength range may correspond to a second primary color component, and the third wavelength range may correspond to a third primary color component.

According to the present invention, there is provided a second illumination device including: an optical element including a hologram recording medium which diffracts a first coherent light beam having a first wavelength range and a second coherent light beam having a second wavelength range which is different from the first wavelength range; and an irradiation device configured to irradiate the optical element with coherent light beams having different wavelength ranges so as to allow the first coherent light beam and the second coherent light beam to scan the hologram recording medium, wherein the irradiation device and the optical element are arranged such that the first coherent light beams incident from the irradiation device on the respective positions of the hologram recording medium are diffracted by the hologram recording medium to illuminate zones which overlap each other in at least a portion thereof, and the second coherent light beams incident from the irradiation device on the respective positions of the hologram recording medium are diffracted by the hologram recording medium to illuminate the zones which overlap each other in at least a portion thereof.

In the second illumination device according to the present invention, the hologram recording medium may be configured to diffract a third coherent light beam having a third wavelength range different from both of the first wavelength range and the second wavelength range, the coherent light beams having different wavelength ranges irradiated from the irradiation device may further include the third coherent light beam, the irradiation device and the optical element may be arranged such that the third coherent light beams incident from the irradiation device on the respective positions of the hologram recording medium are diffracted by the hologram recording medium to illuminate the zones which overlap each other in at least a portion thereof, and the first wavelength range may correspond to a first primary color component, the second wavelength range may correspond to a second primary color component, and the third wavelength range may correspond to a third primary color component.

Further, in the first or second illumination device according to the present invention, the hologram recording medium may include a plurality of laminated hologram elements which are provided corresponding to the coherent light beams having the respective wavelength ranges.

In addition, in the first or second illumination device according to the present invention, the hologram recording medium may be partitioned into a plurality of zones corresponding to the coherent light beams having the respective wavelength ranges, and the coherent light beams having the respective wavelength ranges may be allowed to reproduce the image when the coherent light beams are incident on the corresponding zones.

According to the present invention, there is provided a third illumination device including: an optical element including a lens array configured to change a traveling direction of an incident light beam; and an irradiation device configured to irradiate the optical element with coherent light beams having different wavelength ranges so that a first coherent light beam having a first wavelength range and a second coherent light beam having a second wavelength range different from the first wavelength range are allowed to scan the lens array, in which the irradiation device and the optical element are arranged such that traveling directions of the first coherent light beams incident from the irradiation device on the respective positions of the lens array are changed by the lens array to illuminate an illuminated zone and such that traveling directions of the second coherent light beams incident from the irradiation device on the respective positions of the lens array are changed by the lens array to illuminate the illuminated zone.

In the third illumination device according to the present invention, coherent light beams having different wavelength ranges which are irradiated from the irradiation device may further include a third coherent light beam having a third wavelength range different from both of the first wavelength range and the second wavelength range, the irradiation device and the optical element may be arranged such that traveling direction of the third coherent light beams incident from the irradiation device on the respective positions of the light diffusion element are changed by the light diffusion element to illuminate the zones which overlap each other in at least a portion thereof, and the first wavelength range may correspond to a first primary color component, the second wavelength range may correspond to a second primary color component, and the third wavelength range may correspond to a third primary color component.

According to the present invention, there is provided a fourth illumination device including: an optical element including a light diffusion element which changes a traveling direction of an incident light beam; and an irradiation device configured to irradiate the optical element with coherent light beams having different wavelength ranges so that a first coherent light beam having a first wavelength range and a second coherent light beam having a second wavelength range different from the first wavelength range are allowed to scan the light diffusion element, in which the irradiation device and the optical element are arranged such that traveling directions of the first coherent light beams incident from the irradiation device on the respective positions of the light diffusion element are changed by the light diffusion element to illuminate zones which overlap each other in at least a portion thereof and such that traveling directions of the second coherent light beams incident from the irradiation device on the respective positions of the light diffusion element are changed by the light diffusion element to illuminate the zones which overlap each other in at least a portion thereof.

In the fourth illumination device according to the present invention, the coherent light beams having different wavelength ranges irradiated from the irradiation device may further include a third coherent light beam having a third wavelength range different from both of the first wavelength range and the second wavelength range, the irradiation device and the optical element may be arranged such that a traveling directions of the third coherent light beams incident from the irradiation device on the respective positions of the light diffusion element are changed by the light diffusion element to illuminate the zones which overlap each other in at least a portion thereof, and the first wavelength range may correspond to a first primary color component, the second wavelength range may correspond to a second primary color component, and the third wavelength range may correspond to a third primary color component.

In the third or fourth illumination device according to the present invention, the light diffusion element may be a lens array.

In any one of the first to fourth illumination devices according to the present invention, the coherent light beams having different wavelength ranges may be irradiated in the same optical path from the irradiation device on the optical element.

In any one of the first to fourth illumination device according to the present invention, the irradiation device may include a light source system which generates a combined light beam formed by combining the coherent light beams having different wavelength ranges and a scan device configured to change a traveling direction of the combined light beam from the light source system so that the combined light beam is allowed to scan the optical element. In any one of the first to fourth illumination device according to the present invention, the light source system may be configured to include a plurality of light sources which generate coherent light beams having the respective wavelength ranges and a combining device which combines the coherent light beams from the plurality of light sources.

In addition, in any one of the first to fourth illumination device according to the present invention, the irradiation device may irradiate the optical element with the plurality of coherent light beams having different wavelength ranges in a time division manner. In other words, the irradiation device may irradiate the optical element with the coherent light beams having different wavelength ranges by sequentially shifting time, that is, by delaying timing.

A projection device according to the present invention includes: any one of the first to fourth illumination devices; and a spatial light modulator positioned at a position which overlaps a zone which is to be illuminated by the illumination device so as to be illuminated by the illumination device.

The projection device according to the present invention may further include a projection optical system which projects a modulation image obtained on the spatial light modulator on a screen.

According to the present invention, there is provided a first projection-type image display device includes: any one of the projection devices according to the present invention; and a screen on which a modulation image obtained on the spatial light modulator is projected.

According to the present invention, there is provided a second projection-type image display device includes: any one of the first to fourth illumination devices according to the present invention; and a screen positioned at a position which overlaps a zone which is to be illuminated by the illumination device.

According to the present invention, it is possible to effectively allow speckles to be inconspicuous on an illuminated zone or an image projection surface.

MODE FOR CARRYING OUT THE INVENTION

Figure 1:
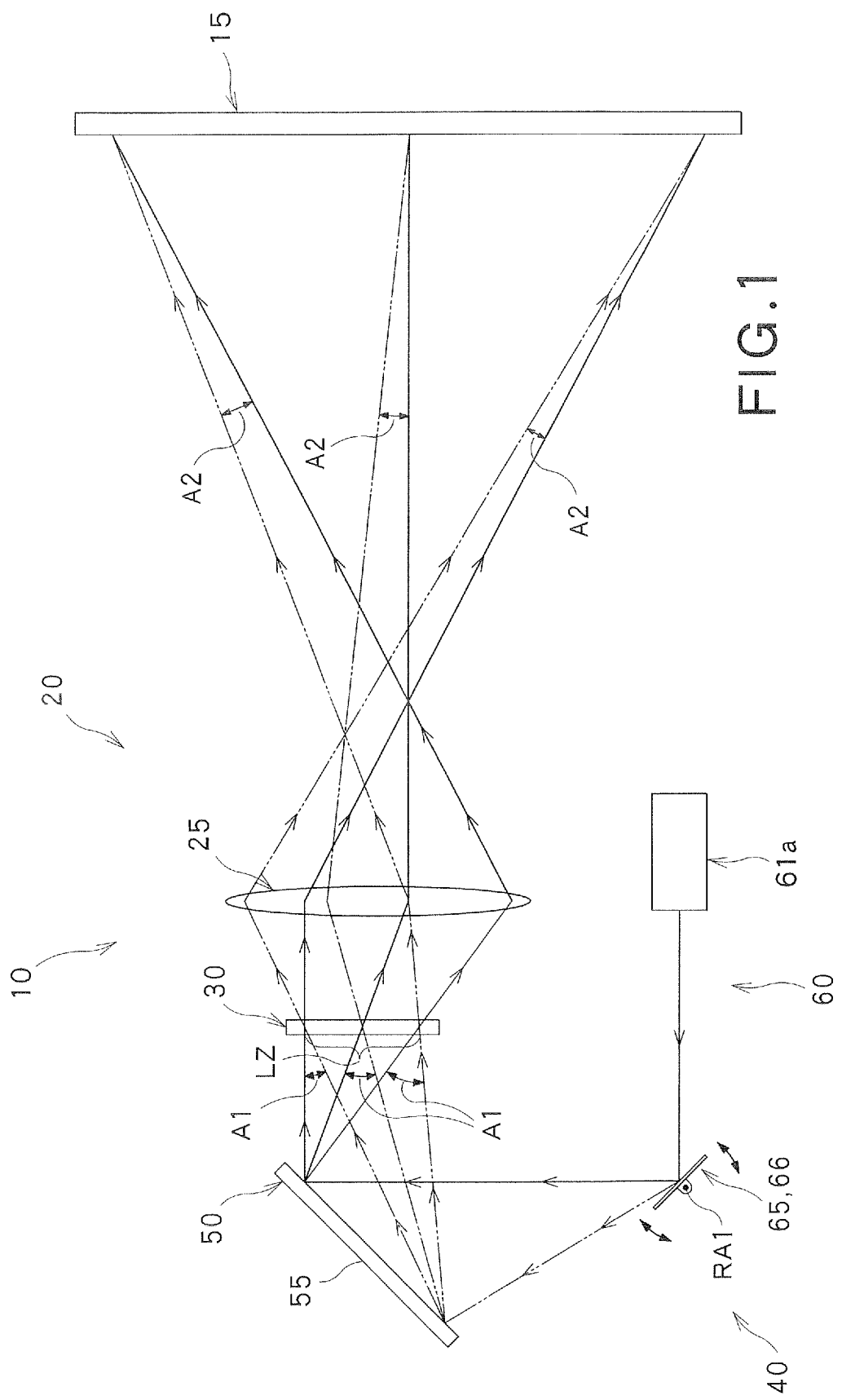
FIG. 1 is a diagram illustrating a basic form according to an embodiment of the present invention and illustrating schematic configurations of an illumination device, a projection device, and a projection-type image display device as a specific example of the basic form.

Hereinafter, embodiments of the present invention will be described with reference to the drawings. In addition, in the drawings attached to the specification, for the better understanding and the convenience of illumination, reduction scales, aspect ratios, and the like are exaggerated differently from those of real objects.

An illumination device, a projection device, and a projection-type image display device according to the embodiments of the present invention have a basic configuration capable of effectively preventing speckles from occurring. In addition, an illumination device, a projection device, and a projection-type image display device according to the embodiments of the present invention has an applied configuration of the basic configuration capable of effectively preventing speckles from occurring and a configuration capable of allowing a plurality of coherent light beams having mutually different wavelength ranges to be treated.

In the description hereinafter, first, a configuration which is capable of allowing speckles to be inconspicuous, functions and effects which can be obtained based on the configuration, and modified forms of the configuration will be described as a basic embodiment with reference to a projection-type image display device including an illumination device and a projection device illustrated in FIGS. 1 to 9. Next, a configuration which is an applied configuration of the basic embodiment and is capable of allowing a plurality of coherent light beams having mutually different wavelength ranges to be treated, functions and effects which can be obtained based on the configuration, and modified forms of the configuration will be described as an applied embodiment.

<Basic Embodiment>

[Configuration of Basic Embodiment]

First, a configuration of a projection-type image display device which includes an illumination device and a projection device projecting a coherent light beam and is capable of allowing speckles to be inconspicuous will be described mainly with reference to FIGS. 1 to 9.

The projection-type image display device 10 illustrated in FIG. 1 is configured to include a screen 15 and a projection device 20 which projects image light beams which includes coherent light beams. The projection device 20 is configured to include an illumination device 40 which illuminates an illuminated zone LZ located on a virtual plane with the coherent light beams, a spatial light modulator 30 which is disposed at a position overlapping the illuminated zone LZ and is illuminated with the coherent light beams by the illumination device 40, and a projection optical system 25 which projects the coherent light beams from the spatial light modulator 30 on the screen 15.

For example, a transmission-type liquid crystal micro display may be used as the spatial light modulator 30. In this case, the spatial light modulator 30 which is illuminated in a planar shape by the illumination device 40 selectively transmits the coherent light beam for each pixel, so that a modulation image is formed on the screen of the display constituting the spatial light modulator 30. The modulation image (image light beams) obtained in this manner is projected on the screen 15 with equal or changed magnification by the projection optical system 25. Therefore, the modulation image is displayed on the screen 15 with equal or changed magnification (generally, enlargement), so that an observer can observe the image.

In addition, a reflection-type micro display may also be used as the spatial light modulator 30. In this case, a modulation image is formed by reflected light beams from the spatial light modulator 30, and a plane which is irradiated with the coherent light beam from the illumination device 40 to the spatial light modulator 30 and a plane from which image light beams constituting the modulation image from the spatial light modulator 30 progress out are the same plane. In the case where the reflected light beams are used, a MEMS element such as a DMD (Digital Micromirror Device) may also be used as the spatial light modulator 30. In the device disclosed in JP6-208089A described above, the DMD is used as a spatial light modulator.

In addition, it is preferable that the incident surface of the spatial light modulator 30 has the same shape and size as those of the illuminated zone LZ which is illuminated with the coherent light beams by the illumination device 40. This is because, in this case, the coherent light beams from the illumination device 40 can be used to display an image on the screen 15 with high use efficiency.

The screen 15 may be configured as a transmission-type screen or maybe configured as a reflection-type screen. In the case where the screen 15 is configured as a reflection-type screen, an observer observes an image displayed by the coherent light beams reflected by the screen 15 from the same side as the projection device 20 with respect to the screen 15. On the other hand, in the case where the screen 15 is configured as a transmission-type screen, an observer observes an image displayed by the coherent light beams passing through the screen 15 from the side opposite to the projection device 20 with respect to the screen 15.

The coherent light beams projected on the screen 15 are diffused to be recognized as an image by the observer. At this time, the coherent light beams projected on the screen interfere due to the diffusion thereof, so that speckles occur. However, in the projection-type image display device 10 described herein, since the illumination device 40 described hereinafter is configured to illuminate the illuminated zone LZ, which overlaps the spatial light modulator 30, with the coherent light beams of which incident angles are changed temporally. More specifically, although the illumination device 40 described hereinafter illuminates the illuminated zone LZ with diffused light beams including the coherent light beams, the incident angles of the diffused light beams is changed temporally. As a result, the diffusion pattern of the coherent light beams on the screen 15 is also changed with time, and the speckles occurring due to the diffusion of the coherent light beams are superimposed temporally, so that the speckles are inconspicuous. Hereinafter, the illumination device 40 will be described more in detail.

Figure 2:
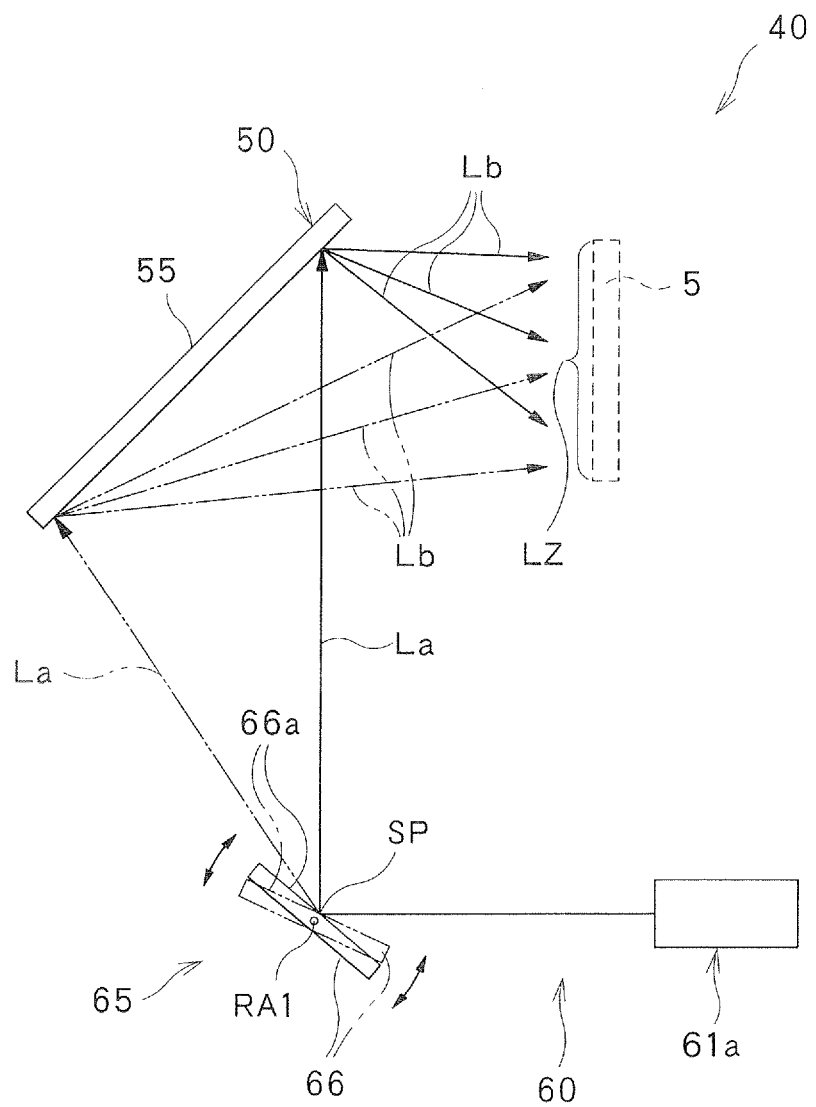
FIG. 2 is a diagram illustrating the illumination device illustrated in FIG. 1.

The illumination device 40 illustrated in FIGS. 1 and 2 is configured to include an optical element 50 which directs the traveling directions of the coherent light beams to the illuminated zone LZ and an irradiation device 60 which irradiates the optical element 50 with the coherent light beams. The optical element 50 includes a hologram recording medium 55 which functions as a light diffusion element or a light diffusion component, particularly, a hologram recording medium 55 which can reproduce an image 5 of a scattering plate 6. In the example illustrated, the optical element 50 is made of the hologram recording medium 55.

In the example illustrated, the hologram recording medium 55 constituting the optical element 50 receives the coherent light beams irradiated from the irradiation device 60 as reproduction illumination light beams La to diffract the coherent light beams with high efficiency. Particularly, the hologram recording medium 55 diffracts each coherent light beam which is incident on each position, that is, each micro zone which is to be called each point, so that the image 5 of the scattering plate 6 can be reproduced.

On the other hand, the irradiation device 60 irradiates the optical element 50 with the coherent light beams so that the coherent light beams scan the hologram recording medium 55 of the optical element 50. Therefore, at some instance, a zone of the hologram recording medium 55 irradiated with the coherent light beams by the irradiation device 60 is a portion of the surface of the hologram recording medium 55. Particularly, in the example illustrated, the zone is a micro zone which is to be called a point.

The coherent light beams which are irradiated from the irradiation device 60 to scan the hologram recording medium 55 are incident on respective positions (respective points or respective zones (same as hereinafter)) on the hologram recording medium 55 with incident angles satisfying a diffraction condition of the hologram recording medium 55. The coherent light beams which are incident from the irradiation device 60 on the respective positions of the hologram recording medium 55 are diffracted by the hologram recording medium 55, so that the zones which overlap each other in at least a portion thereof are illuminated with the coherent light beams. Particularly, in the embodiment described herein, the coherent light beams which are incident from the irradiation device 60 on the respective positions of the hologram recording medium 55 are diffracted by the hologram recording medium 55, so that the same illuminated zone LZ is illuminated with the coherent light beams. More specifically, as illustrated in FIG. 2, the coherent light beams which are incident from the irradiation device 60 on the respective positions of the hologram recording medium 55 reproduce the image 5 of the scattering plate 6 such that the reproduced images 5 of the scattering plate 6 overlap on the illuminated zone LZ. In other words, the coherent light beams which are incident from the irradiation device 60 on the respective positions of the hologram recording medium 55 are diffused (spread) by the optical element 50 to be incident on the illuminated zone LZ.

Figure 3:
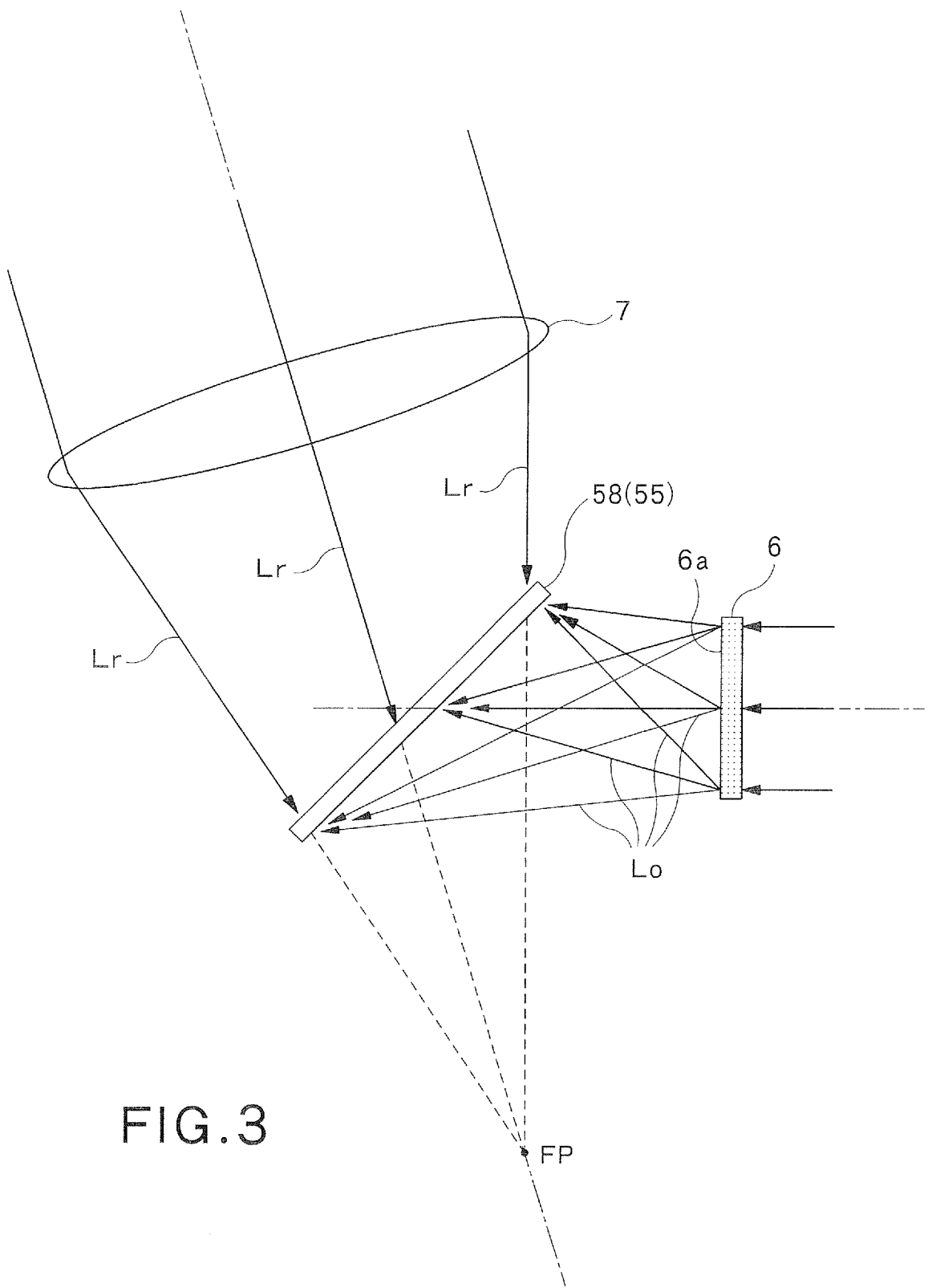
FIG. 3 is a diagram illustrating an exposure method for manufacturing a hologram recording medium constituting optical elements of the illumination device illustrated in FIG. 2.

In the example illustrated, a reflection-type volume hologram using a photopolymer is used as the hologram recording medium 55 which enables the above diffraction function of the coherent light beams. As illustrated in FIG. 3, the hologram recording medium 55 is manufactured by using scattered light beams from the scattering plate 6 as object light beams Lo. FIG. 3 illustrates a state where a hologram photosensitive material 58 having photosensitivity which is to be constitute the hologram recording medium 55 is exposed by the reference light beams Lr and object light beams Lo which are the coherent light beams having mutual coherency.

For example, laser beams of the laser source which oscillates laser beams in a specific wavelength range are used as the reference light beams Lr, and the reference light beams Lr pass through a light collection element 7 including lenses to be incident on the hologram photosensitive material 58. In the example illustrated in FIG. 3, the laser beams constituting the reference light beams Lr are incident on the light collection element 7 as a parallel light flux which is parallel to an optical axis of the light collection element 7. The reference light beams Lr pass through the light collection element 7, so that the reference light beams Lr are shaped (transformed) from the parallel light flux to a converging light flux to be incident on the hologram photosensitive material 58. At this time, the focal point FP of the converging light flux Lr is located beyond the hologram photosensitive material 58. In other words, the hologram photosensitive material 58 is disposed between the light collection element 7 and the focal point FP of the converging light flux Lr which is condensed by the light collection element 7.

The object light beams Lo as the scattered light beams from the scattering plate 6 made of, for example, an opal glass are incident on the hologram photosensitive material 58. Since the hologram recording medium 55 which is to be manufactured herein is a reflection-type, the object light beams Lo are incident from the plane of the side opposite to the reference light beams Lr on the hologram photosensitive material 58. The object light beams Lo need to have coherency with the reference light beams Lr. Therefore, for example, a laser beam oscillated from the same laser source may be divided, one of the divided beams may be used as the reference light beam Lr, and the other may be used as the object light beam Lo.

In the example illustrated in FIG. 3, the parallel light flux which is parallel to the normal direction of the plate plane of the scattering plate 6 is incident on the scattering plate 6 to be scattered, and the scattered light beams passing through the scattering plate 6 are incident as the object light beams Lo on the hologram photosensitive material 58. According to this method, in the case where an isotropic scattering plate which is generally available at low cost is used as the scattering plate 6, the object light beams Lo from the scattering plate 6 can be incident on the hologram photosensitive material 58 with a substantially uniform light amount distribution. In addition, according to this method, although the light amount distribution depends on the degree of scattering of the scattering plate 6, the reference light beams Lr are easily incident from the entire area of the light emitting surface 6a of the scattering plate 6 to the positions of the hologram photosensitive material 58 with a substantially uniform light amount. In this case, due to the light beams which are incident on the respective positions of the hologram recording medium 55 obtained, it is possible to implement reproduction of the image 5 of the scattering plate 6 with the same brightness and observation of the reproduced image 5 of the scattering plate 6 with substantially uniform brightness.

In this manner, if the hologram recording material 58 is exposed to the reference light beams Lr and the object light beams Lo, interference fringe is generated by interference between the reference light beams Lr and the object light beams Lo, and the interference fringe of these light beams is recorded in the hologram recording material 58 as some pattern (for example, in the case of a volume hologram, a refractive index modulation pattern). Next, appropriate post processes corresponding to the type of the hologram recording material 58 are performed, so that the hologram recording material 55 is obtained.

Figure 4:
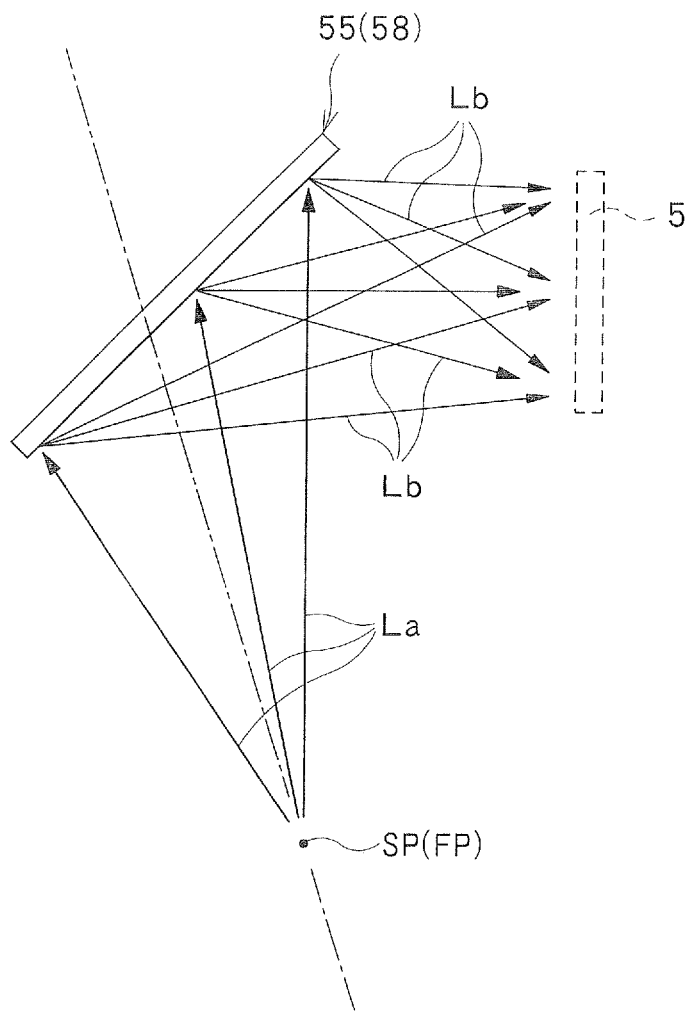
FIG. 4 is a diagram illustrating functions of a hologram recording medium manufactured through the exposure method illustrated in FIG. 3.

FIG. 4 illustrates a diffraction function (reproduction function) of the hologram recording medium 55 obtained through the exposing process of FIG. 3. As illustrated in FIG. 4, with respect to the hologram recording medium 55 formed from the hologram photosensitive material 58 of FIG. 3, the light beams having the same wavelength as that of the laser beam used for the exposing process, which travel in the reverse direction along the optical path of the reference light beams Lr in the exposing process, satisfy the Bragg condition. In other words, as illustrated in FIG. 4, a diverging light flux, which has the same positional relationship as the relative position (refer to FIG. 3) of the focal point FP with respect to the hologram photosensitive material 58 during the exposing process to diverge from a standard point SP located with respect to the hologram recording medium 55 and has the same wavelength as that of the reference light beams Lr during the exposing process, is diffracted as the reproduction illumination light beams La to the hologram recording medium 55, so that the reproduced image 5 of the scattering plate 6 is generated at a specific position with respect to the hologram recording medium 50 which has the same positional relationship as the relative position (refer to FIG. 3) of the scattering plate 6 with respect to the hologram photosensitive material 58 during the exposing process.

At this time, reproduction light beams (light beams obtained by diffracting the reproduction illumination light beams La with the hologram recording medium 55) Lb which reproduce respective points of the image 5 of the scattering plate 6 as light beams which travel in the reverse direction along the optical path of the object light beams Lo which travel from the scattering plate 6 toward the hologram photosensitive material 58 during the exposing process. In addition, as described above, as illustrated in FIG. 3, the scattered light beams Lo which emit from the positions of the light emitting surface 6a of the scattering plate 6 during the exposing process are diffused (spread) so as to be incident on the substantially entire area of the hologram photosensitive material 58. In other words, the object light beams Lo from the entire area of the light emitting surface 6a of the scattering plate 6 are incident on the respective positions on the hologram photosensitive material 58, so that information of the entire light emitting surface 6a is recorded in the respective positions of the hologram recording medium 55. Therefore, the light beams constituting the diverging light flux from the standard point SP which function as the reproduction illumination light beams La illustrated in FIG. 4 are individually incident on the respective positions of the hologram recording medium 55, so that the images 5 of the scattering plate 6 having mutually the same contour can be reproduced at mutually the same positions (illuminated zone LZ).

On the other hand, the irradiation device 60 which irradiates the optical element 50 including the hologram recording medium 55 with the coherent light beams may be configured as follows. In the example illustrated in FIGS. 1 and 2, the irradiation device 60 is configured to include a laser source 61a which generates coherent light beams of a specific wavelength range and a scan device 65 which changes traveling directions of the coherent light beams from the laser source 61a. The scan device 65 changes the traveling directions of the coherent light beams with time, so that the traveling directions of the coherent light beams are not a certain direction but various directions. As a result, the coherent light beams of which the traveling directions are changed by the scan device 65 are allowed to scan the incidence surface of the hologram recording medium 55 of the optical element 50.

Figure 5:
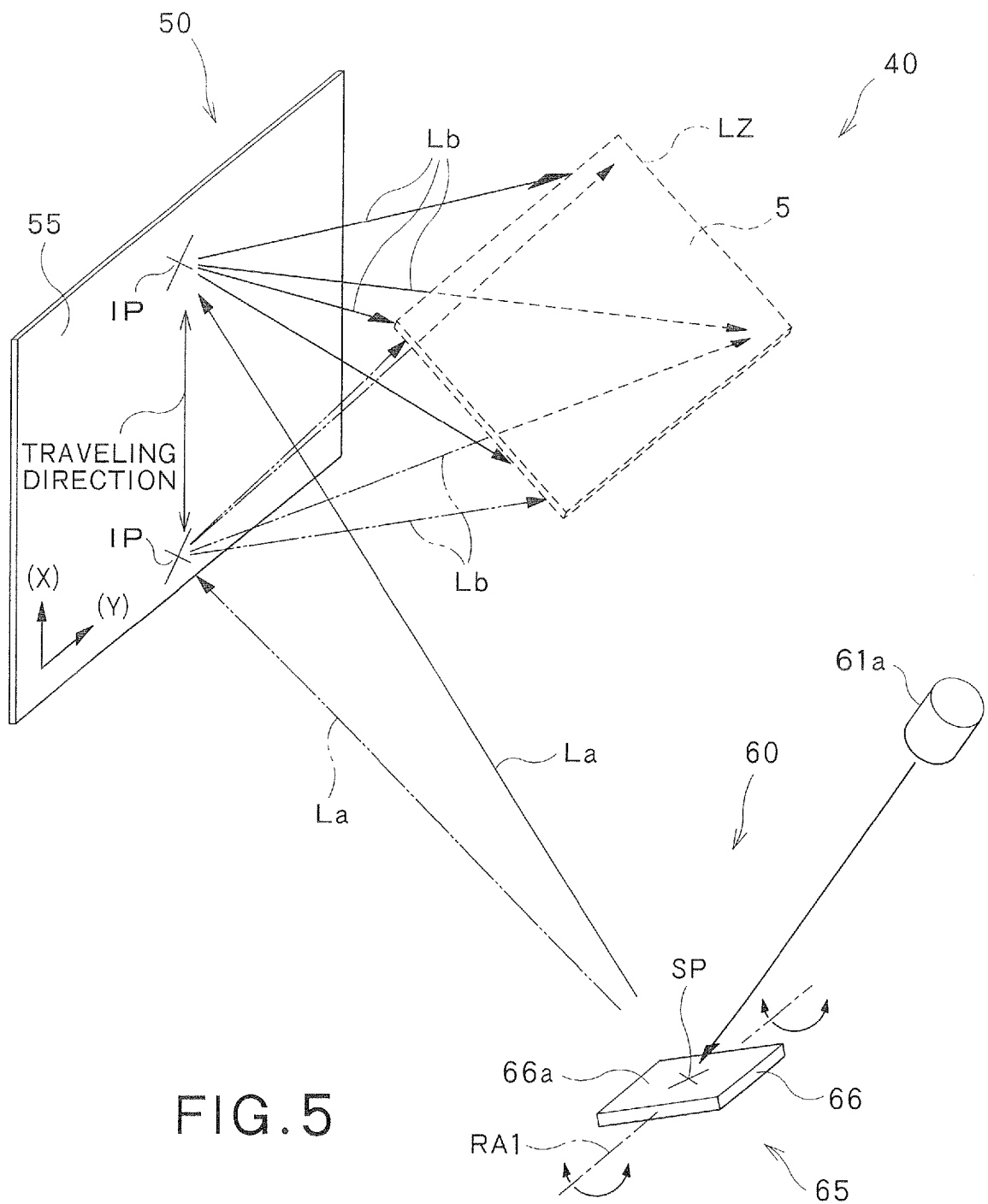
FIG. 5 is a perspective diagram illustrating functions of the illumination device illustrated in FIG. 1.

Particularly, in the example illustrated in FIG. 2, the scan device 65 is configured to include a reflection device 66 having a reflection surface 66a which can rotate about one axial line RA1. More specifically, the reflection device 66 is configured as a mirror device having a mirror as the reflection surface 66a which can rotate about the one axial line RA1. In addition, as illustrated in FIGS. 2 and 5, the mirror device 66 changes the traveling directions of the coherent light beams from the laser source 61a by changing the orientation of the mirror 66a. At this time, as illustrated in FIG. 2, the mirror device 66 substantially receives the coherent light beams from the laser source 61a at the standard point SP. Therefore, the coherent light beam of which traveling direction is finally adjusted by the mirror device 66 can be incident on the hologram recording medium 55 of the optical element 50 as the reproduction illumination light beam La (refer to FIG. 4) which can constitute one light ray of the diverging light flux from the standard point SP. As a result, the coherent light beams of the irradiation device 60 are allowed to scan the hologram recording medium 55, and the coherent light beams which are incident on the respective positions of the hologram recording medium 55 are allowed to reproduce the image 5 of the scattering plate 6 having the same contour at the same point (illuminated zone LZ).

In addition, the mirror device 66 illustrated in FIG. 2 is configured to rotate the mirror 66a about one axial line RA1. FIG. 5 is a perspective diagram illustrating a configuration of the illumination device 40 illustrated in FIG. 2. In the example illustrated in FIG. 5, the rotation axial line RA1 of the mirror 66a is extended in parallel to the Y axis of the XY coordinate system defined on the plate plane of the hologram recording medium 55 (that is, the XY coordinate system where the XY plane is parallel to the plate plane of the hologram recording medium 55). In addition, since the mirror 66a rotates about the axial line RA1 which is parallel to the Y axis of the XY coordinate system defined on the plate plane of the hologram recording medium 55, the incidence point IP of the coherent light beam from the irradiation device 60 to the optical element 50 is reciprocally moved in the direction which is parallel to the X axis of the XY coordinate system defined on the plate plane of the hologram recording medium 55. In other words, in the example illustrated in FIG. 5, the irradiation device 60 irradiates the optical element 50 with the coherent light beams so that the coherent light beams are allowed to scan the hologram recording medium 55 along the straight line path.

In addition, as a practical problem, there is a case where the hologram recording material 58 is contracted during the manufacturing of the hologram recording medium 55. In this case, by taking into consideration the contraction of the hologram recording material 58, it is preferable that the recording angles of the coherent light beam which is irradiated on the optical element 50 by the irradiation device 60 be adjusted. Therefore, the wavelength of the coherent light beam generated by the coherent light source 61a needs not to be strictly equal to, but may be substantially equal to the wavelength of the light beam used in the exposing process (recording process) of FIG. 3.

In addition, for the same reason, although the traveling direction of the light beam incident on the hologram recording medium 55 of the optical element 50 is not taken to be strictly equal to one light ray constituting the diverging light flux from the standard point SP, the image 5 can be reproduced in the illuminated zone LZ. Actually, in the example illustrated in FIGS. 2 and 5, the mirror (reflection surface) 66a of the mirror device 66 constituting the scan device 65 is necessarily shifted from the rotation axial line RA1. Therefore, in the case where the mirror 66a is allowed to rotate about the rotation axial line RA1 which does not pass through the standard point SP, the light beam incident on the hologram recording medium 55 may not be one light ray constituting the diverging light flux from the standard point SP. However, in a practical case, the coherent light beams of the irradiation device 60 having the illustrated configuration are allowed to reproduce the image 5 substantially superimposed on the illuminated zone LZ.

[Functions and Effects of Basic Embodiment]

Next, the functions of the illumination device 40, the projection device 20, and the projection-type image display device having the configuration described hereinbefore will be described.

First, the irradiation device 60 allows the coherent light beams to scan the hologram recording medium 55 of the optical element 50 to irradiate the optical element 50 with the coherent light beams. More specifically, the laser source 61a generates the coherent light beams having a specific wavelength range which travel in a constant direction, and the traveling directions of the coherent light beams can be changed by the scan device 65. The scan device 65 allows the coherent light beams having a specific wavelength range to be incident on the respective positions of the hologram recording medium 55 with incident angles satisfying the Bragg condition of the positions. As a result, due to the diffraction of the hologram recording medium 55, the coherent light beams incident on the respective positions reproduce the image 5 of the scattering plate 6 such that the reproduced images 5 of the scattering plate 6 overlap on the illuminated zone LZ. In other words, the coherent light beams which are incident from the irradiation device 60 on the respective positions of the hologram recording medium 55 are diffused (spread) by the optical element 50 to be incident on the entire area of the illuminated zone LZ. In this manner, the irradiation device 60 illuminates the illuminated zone LZ with the coherent light beams.

As illustrated in FIG. 1, in the projection device 20, the spatial light modulator 30 is disposed at the position which overlaps the illuminated zone LZ of the illumination device 40. Therefore, with respect to the spatial light modulator 30, the surface thereof is illuminated by the illumination device 40, and each pixel is allowed to selectively transmit the coherent light beam, so that an image is formed. This image is projected on the screen 15 by the projection optical system 25. The coherent light beams projected on the screen 15 are diffused and recognized as an image by an observer. However, at this time, the coherent light beams projected on the screen interfere with each other due to the diffusion, so that speckles occur.

However, according to the illumination device 40 of the basic embodiment described herein, as described below, it is possible to very effectively allow the speckles to be inconspicuous.

The above-described literature "Speckle Phenomena in Optics, Joseph W. Goodman, Roberts & Co. 2006" discloses that multiplexing of parameters of polarization, phase, angle, and time and increasing of modes are effective to allow the speckles to be inconspicuous. Herein, the modes denote speckle patterns having no correlation therebetween. For example, in the case where the coherent light beams of a plurality of the laser sources are projected on the same screen in different directions, there are modes of which the number is equal to the number of the laser sources. In addition, in the case where the coherent light beams of the same laser source are projected on the screen in different directions in a time division manner, there are modes of which the number is equal to the number of times of changing of the incident direction of the coherent light beam within a time which may not be resolved by human eyes. In addition, it is considered that, in the case where a plurality of the modes exist, the interference patterns of light beams overlap each other with no correlation to be averaged, so that it is possible to allow the speckles observed with observer's eyes to be inconspicuous.

In the irradiation device 60 described above, the coherent light beams are allowed to scan the hologram recording medium 55 to be irradiated on the optical element 50. In addition, with respect to the coherent light beams which are incident from the irradiation device 60 on the respective positions of the hologram recording medium 55, although the entire area of the same illuminated zone LZ is illuminated with the coherent light beams, the illumination directions of the coherent light beams which are illuminated on the illuminated zone LZ are different from each other. In addition, since the positions of the hologram recording medium 55 where the coherent light beams are incident are changed with time, the incident directions of the coherent light beams incident on the illuminated zone LZ are also changed with time.

If the illuminated zone LZ is considered as a standard, although the coherent light beam is consistently incident on the each position inside the illuminated zone LZ, the incident direction thereof is always continuously changed as indicated by arrow A1 in FIG. 1. As a result, the light beams constituting respective pixels of the image formed by the transmitted light beams of the spatial light modulator 30 are projected on specific positions of the screen 15 while the optical path is changed with time as indicated by arrow A2 of FIG. 1.

In addition, the coherent light beams are allowed to continuously scan the hologram recording medium 55. Therefore, the incident direction of the coherent light beam incident from the irradiation device 60 on the illuminated zone LZ is also continuously changed, and the incident direction of the coherent light beam incident from the projection device 20 on the screen 15 is also continuously changed. Herein, if the incident direction of the coherent light beam incident from the projection device 20 on the screen 15 is changed by only a small amount (for example, several deci-degrees), the pattern of speckles occurring on the screen 15 is also greatly changed, so that speckle patterns having no correlation are superimposed sufficiently. In addition, the frequency of the scan device 65 such as a MEMS mirror or a polygon mirror which is actually commercially available is typically several hundred Hz or more, and in some cases, the frequency of the scan device 65 may be several tens of thousands of Hz.

Hereinbefore, according to the basic embodiment described above, the incident directions of the coherent light beams are changed temporally at the positions of the screens 15 displaying the image, and the speed of the change thereof is such a speed that the change may not be resolved by human eyes, and thus, the multiplexed scattering patterns of the coherent light beams having no correlation are observed by human eyes. Therefore, the speckles occurring corresponding to the respective scattering patterns overlap to be averaged and are observed by an observer. Therefore, with respect to the observer who observes the image displayed on the screen 15, the speckles are very effectively allowed to be inconspicuous.

In addition, with respect to the speckles observed by human in the prior art, the speckles of the screen side may occur due to the scattering of the coherent light beams on the screen 15, and the speckles of the projection device side may occur due to the scattering of the coherent light beams before projection on the screen. The speckle pattern occurring at the projection device side is projected on the screen 15 through the spatial light modulator 30, so that the speckle pattern can be recognized by the observer. However, according to the basic embodiment described above, the coherent light beams are allowed to continuously scan the hologram recording medium 55, and the coherent light beams which are incident on the respective positions of the hologram recording medium 55 illuminate on the entire area of the illuminated zone LZ in which the spatial light modulator 30 is overlapped. In other words, a new wavefront surface different from the existing wavefront surface, where the speckle pattern is formed, is formed on the hologram recording medium 55, and the screen 15 is illuminated complicatedly and uniformly through the illuminated zone LZ and the spatial light modulator 30. Due to the formation of the new wavefront surface on the hologram recording medium 55, the speckle pattern occurring at the projection device side may not be visually perceived.

The above-described literature "Speckle Phenomena in Optics, Joseph W. Goodman, Roberts & Co. 2006" discloses a method of using a numerical value called speckle contrast as a parameter indicating a degree of speckles occurring on the screen. The speckle contrast is a quantity defined as a value obtained by dividing a standard deviation of luminance difference actually occurring on a screen at the time of displaying an image of a test pattern which needs to have an originally uniform luminance distribution by an average value of luminance. As the value of speckle contrast is increased, the degree of occurrence of speckles on the screen is increased, and thus, a punctate luminance unevenness pattern is more remarkably represented to an observer.

In the projection-type image display device 10 according to the basic embodiment described with reference to FIGS. 1 to 5, the speckle contrast is measured to be 3.0% (Condition 1). In addition, in the case where, instead of the reflection-type volume hologram, a relief-type hologram which is a computer generated hologram (CGH) having a convex-concave shape designed by using a computer so as to reproduce the image 5 of the scattering plate 6 when specific reproduction illumination light beams are irradiated is used as the optical element 50 described above, the speckle contrast is measured to be 3.7% (Condition 2). In the application of HDTV (high definition TV) image display, although a criterion that the speckle contrast is 6.0% or less is set (for example, refer to WO/2001/081996) as a level that an observer may not almost recognize a luminance unevenness pattern through visual observation, the basic embodiment described above satisfies the criterion sufficiently. In addition, actually, in visual observation, luminance unevenness (brightness unevenness) to a degree that it can be visually perceived does not occur.

On the other hand, in the case where the laser beams of the laser source are shaped to be in the parallel light flux and are incident on the spatial light modulator 30, that is, in the case where the coherent light beams of the laser source 61a as the parallel light flux are incident on the spatial light modulator 30 of the projection-type image display device 10 illustrated in FIG. 1 without use of the scan device 65 or the optical element 50, the speckle contrast becomes 20.7% (Condition 3). Under the condition, the punctate luminance unevenness pattern is very conspicuously observed through visual observation.

In addition, in the case where the light source 61a is replaced with a green LED (incoherent light source) and the light beams of the LED light source are incident on the spatial light modulator 30, that is, in the case where the incoherent light beams of the LED light source as the parallel light flux are incident on the spatial light modulator 30 of the projection-type image display device 10 illustrated in FIG. 1 without the scan device 65 or the optical element 50, the speckle contrast becomes 4.0% (Condition 4). Under the condition, luminance unevenness (brightness unevenness) to a degree that it can be perceived through visual observation does not occur.

The results of Conditions 1 and 2 are much better than the result of Condition 3, and the results of Conditions 1 and 2 are better than the measurement result of Condition 4. As described above, the problem of occurrence of speckles is practically an intrinsic problem occurring in the case of using a coherent light source such as a laser source, and thus, the problem needs not be considered in the case of a device using an incoherent light source such as an LED. In addition, in comparison with Condition 4, in Conditions 1 and 2, the optical element 50 which may cause occurrence of speckles is added. In terms of this point, it is considered that it is possible to sufficiently cope with the speckle defect according to Conditions 1 and 2.

In addition, according to the basic embodiment described above, the following advantages can be obtained.

According to the basic embodiment described above, the optical element 50 for allowing the speckles to be inconspicuous may also function as an optical member for shaping and adjusting the beam shape of the coherent light beam irradiated from the irradiation device 60. Therefore, it is possible to miniaturize and simplify the optical system.

In addition, according to the basic embodiment described above, the coherent light beams incident on the respective positions of the hologram recording medium 55 generates the image 5 of the scattering plate 6 at mutually the same position, and the spatial light modulator 30 is disposed to overlap the image 5. Therefore, the light beams diffracted by the hologram recording medium 55 can be used for image formation with high efficiency, so that use efficiency of the light of the light source 61a is excellent.

[Modification of Basic Embodiment]

The basic embodiment described above based on one specific example exemplified in FIGS. 1 to 5 can be modified in various forms. Hereinafter, modified examples will be described with reference to the drawings. In the drawings used for the description hereinafter, the components corresponding to those of the embodiments described above are denoted by the same reference numerals, and the redundant description thereof will not be provided.

(Illumination Device)

According to the embodiment described above, it is possible to effectively allow the speckles to be inconspicuous. The functions and effects are obtained mainly by the illumination device 40. Therefore, the illumination device 40 may be usefully used in various forms. For example, the illumination device 40 may be used as a simple illumination device, and in this case, it is possible to allow brightness unevenness (luminance unevenness, blinking) to be inconspicuous.

In addition, the above-described illumination device 40 may be used as an illumination device for a scanner (for example, an image read device). In such an example, a scan object is mounted on the illuminated zone LZ of the illumination device 40, so that it is possible to allow speckles occurring on the object to be inconspicuous. As a result, an image correction unit that is necessary in the related art may be unnecessary.

In the case where the illumination device 40 is combined with a scanner, similarly to the above-described embodiment, the illuminated zone LZ of the illumination device 40 may be a plane. Alternatively, the illuminated zone LZ of the illumination device 40 may be an elongated zone (called a line-shaped zone) which is extended in one direction. In this case, the illumination device 40 combined with the scanner may read two-dimensional image information by performing relative movement with respect to the object in the direction perpendicular to the one direction.

Figure 6:
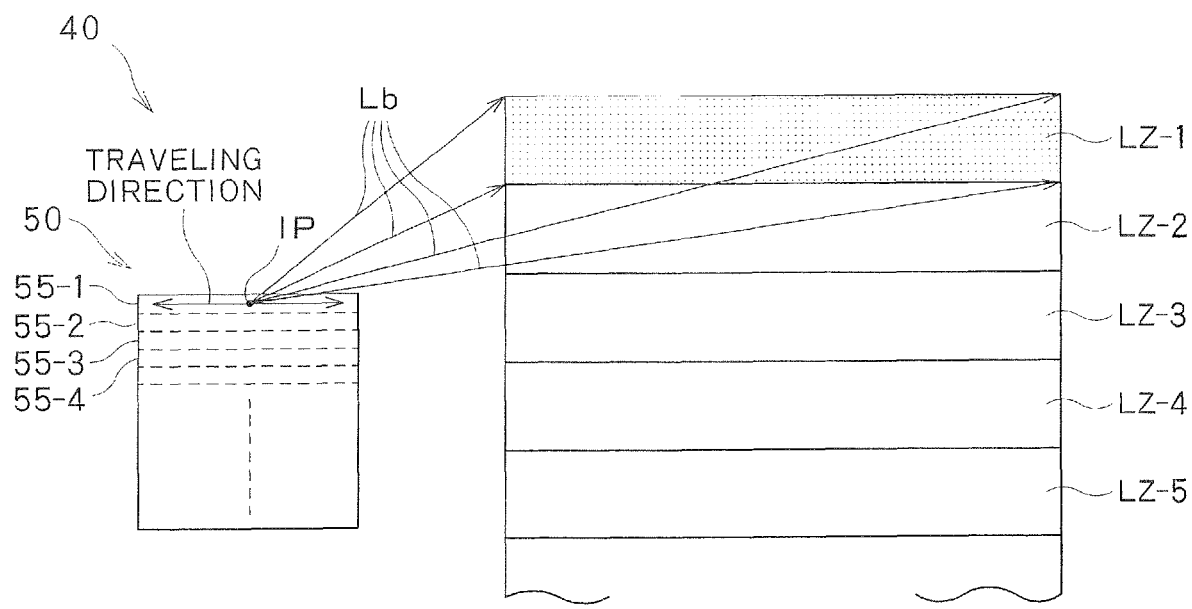
FIG. 6 is a diagram illustrating a modified example of an optical element and is a plan diagram illustrating an optical element together with corresponding illuminated zones.

Furthermore, as illustrated in FIG. 6, the optical element 50 may be configured to include a plurality of hologram recording media 55-1, 55-2, . . . which are arranged side by side so as not to overlap each other. Each of the hologram recording media 55-1, 55-2, . . . illustrated in FIG. 6 is formed in a strip shape, and the hologram recording media 55-1, 55-2, . . . are arranged side by side in the direction perpendicular to the longitudinal direction without a gap. In addition, the hologram recording media 55-1, 55-2, . . . are located on mutually the same virtual plane. The hologram recording media 55-1, 55-2, . . . are configured so as to generate the image 5 of the scattering plate 6 on the respective illuminated zones LZ-1, LZ-2, . . . which are arranged side by side without a gap, that is, to illuminate the illuminated zones LZ-1, LZ-2, . . . with the coherent light beams. Each of the illuminated zones LZ-1, LZ-2, . . . is formed as an elongated zone (called a line-shaped zone) which is extended in one direction, and the illuminated zones LZ-1, LZ-2, . . . are arranged side by side in the direction perpendicular to the longitudinal direction without a gap. In addition, the illuminated zones LZ-1, LZ-2, . . . are located on mutually the same virtual plane.

In the example illustrated in FIG. 6, the illuminated zones LZ-1, LZ-2, . . . . may be illuminated as follows. First, the irradiation device 60 illuminates the first hologram recording medium 55-1 of the optical element 50 with the corresponding coherent light beams so that the coherent light beams are allowed to repetitively scan the path along the longitudinal direction (the one direction described above) of the first hologram recording medium 55-1. The coherent light beams which are incident on the respective positions of the first hologram recording medium 55-1 are allowed to reproduce the image 5 of the line-shaped or elongated scattering plate 6 to be superimposed on the first illuminated zone LZ-1, and the first illuminated zone LZ-1 is illuminated with the coherent light beams. As a predetermined time elapses, the irradiation device 60 irradiates the second hologram recording medium 55-2 adjacent to the first hologram recording medium 55-1 with the coherent light beams, so that the second illuminated zone LZ-2 adjacent to the first illuminated zone LZ-1 is illuminated with the coherent light beams instead of the first illuminated zone LZ-1. Hereinafter, the hologram recording media are sequentially illuminated with the coherent light beams, so that the illuminated zones corresponding to the hologram recording media are illuminated with the coherent light beams. According to the method, it is possible to read two-dimensional image information without movement of the illumination device.

(Spatial Light Modulator, Projection Optical System, and Screen)

According to the embodiment described above, it is possible to effectively allow the speckles to be inconspicuous. The functions and effects are obtained mainly by the illumination device 40. In addition, although the illumination device 40 is combined with various well-known spatial light modulators, projection optical systems, screens, and the like, it is possible to effectively allow the speckles to be inconspicuous. In terms of this point, the spatial light modulators, the projection optical systems, and the screens are not limited to the exemplified ones, but various well-known members, parts, devices, and the like may be used.

(Projection-Type Image Display Device)

In addition, although the example where the hologram recording medium 55 is manufactured by using the planar scattering plate 6 having a shape corresponding to the emincidence surface of the spatial light modulator 30 and by using an interference exposing method is illustrated, the present invention is not limited thereto. The hologram recording medium 55 may be manufactured by using a scattering plate having some pattern and by using the interference exposing method. In this case, the image of the scattering plate having some pattern is reproduced by the hologram recording medium 55. In other words, the optical element 50 (hologram recording medium 55) illuminates the illuminated zone LZ having some pattern. In the case where the optical element 50 is used, the spatial light modulator 30 and the projection optical system 25 may be omitted from the basic embodiment described above, and the screen 15 are disposed at the position which overlaps the illuminated zone LZ, so that some pattern recorded in the hologram recording medium 55 can be displayed on the screen 15. In this display device, the irradiation device 60 irradiates the optical element 50 with the coherent light beams so that the coherent light beams are allowed to scan the hologram recording medium 55, so that it is possible to allow the speckles on the screen 15 to be inconspicuous.

Figure 7:
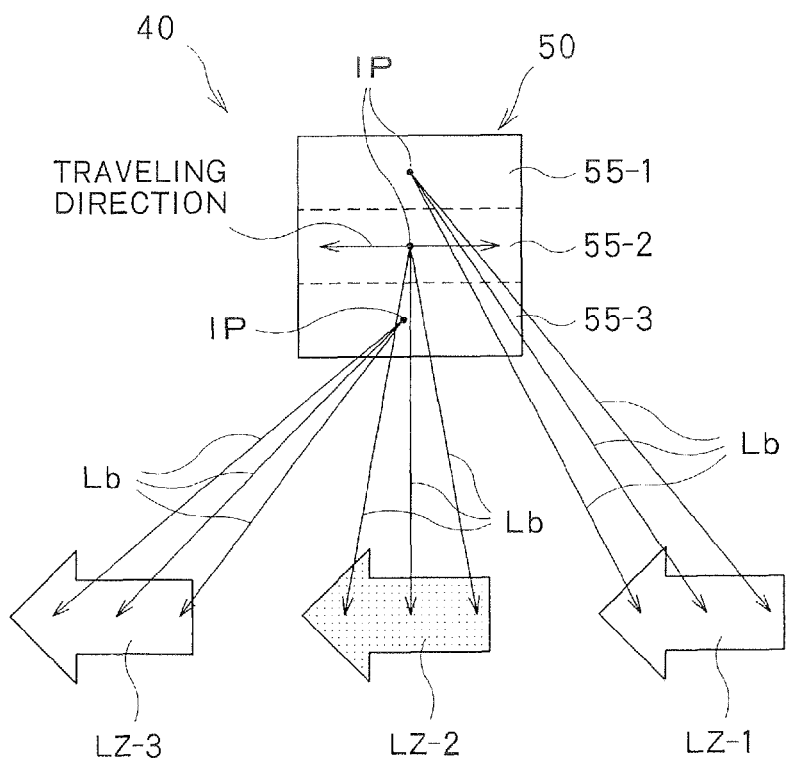
FIG. 7 is a diagram illustrating another modified example of an optical element and is a plan diagram illustrating an optical element together with corresponding illuminated zones.

FIG. 7 illustrates an example thereof. In the example illustrated in the drawing, the optical element 50 is configured to include first to third hologram recording media 55-1, 55-2, and 55-3. The first to third hologram recording media 55-1, 55-2, and 55-3 are shifted from each other so as not to overlap each other and are arranged on a plane parallel to the emincidence surface of the optical element 50. The hologram recording media 55-1, 55-2, and 55-3 can be configured to reproduce images 5 having arrow contours, that is, to illuminate the illuminated zones LZ-1, LZ-2, and LZ-3 having arrow contours with the coherent light beams. The first to third illuminated zones LZ-1, LZ-2, and LZ-3 corresponding to the hologram recording media 55-1, 55-2, and 55-3 are arranged on the same virtual plane so as not to overlap each other. Particularly, in the example illustrated in the drawing, all the directions indicated by the arrows representing the illuminated zones LZ-1, LZ-2, and LZ-3 are all the same, and the first to third illuminated zones LZ-1, LZ-2, and LZ-3 are sequentially located in this direction. For example, in the case where the coherent light beams from the irradiation device 60 are allowed to scan the first hologram recording medium 55-1, the first illuminated zone LZ-1 located at the rear side is illuminated. As an example, next, as illustrated in FIG. 7, the coherent light beams from the irradiation device 60 are allowed to scan the second hologram recording medium 55-2, so that the second illuminated zone LZ-2 located at the center is illuminated. Next, when the coherent light beams from the irradiation device 60 are allowed to scan the third hologram recording medium 55-3, the third illuminated zone LZ-3 located at the front side is illuminated.

Figure 8:
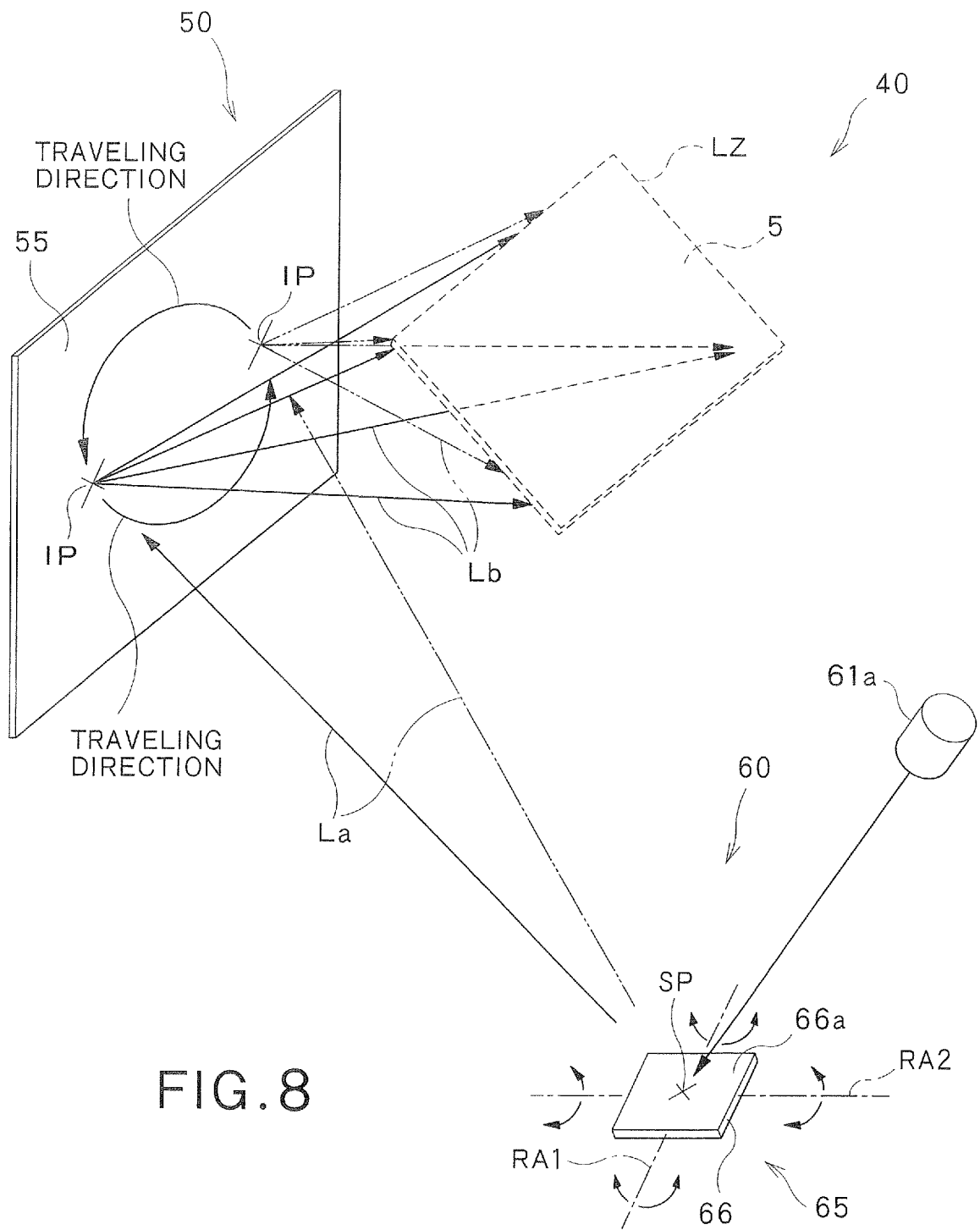
FIG. 8 is a diagram corresponding to FIG. 5 and is a perspective diagram illustrating a modified example of an irradiation device and functions thereof.

(Irradiation Device),

In the embodiment described above, the example where the irradiation device 60 is configured to include the laser source 61*a* and the scan device 65 is illustrated. Although the scan device 65 which is configured with one-axis-rotation type mirror device 66 which changes the traveling directions of the coherent light beams by reflection is exemplified, the scan device 65 is not limited thereto. As illustrated in FIG. 8, the scan device 65 may be configured so that the mirror (reflection surface 66*a*) of the mirror device 66 can rotate about not only the first rotation axial line RA1 but also the second rotation axial line RA2 intersecting the first rotation axial line RA1. In the example illustrated in FIG. 8, the second rotation axial line RA2 of the mirror 66*a* is perpendicular to the first rotation axial line RA1 which is extended in parallel to the Y axis of the XY coordinate system defined on the plate plane of the hologram recording medium 55. In addition, since the mirror 66*a* can rotate about both of the first axial line RA1 and the second axial line RA2, the incidence point IP of the coherent light beam of the irradiation device 60 incident on the optical element 50 can be moved on the plate plane of the hologram recording medium 55 in two-dimensional directions. Therefore, as an example, as illustrated in FIG. 8, the incidence point IP of the coherent light beam incident on the optical element 50 can also be moved along a circumference.

In addition, the scan device 65 may be configured to include two or more mirror devices 66. In this case, although the mirror 66*a* of the mirror device 66 can rotate about only a single axial line, the incidence point IP of the coherent light beam of the irradiation device 60 incident on the optical element 50 can be moved on the plate plane of the hologram recording medium 55 in two-dimensional directions.

In addition, as a specific example of the mirror device 66*a* included in the scan device 65, there are a MEMS mirror, a polygon mirror, and the like.

In addition, the scan device 65 may be configured to include a device besides a reflection device (for example, the mirror device 66 described above) which changes the traveling directions of the coherent light beams by reflection. For example, the scan device 65 may include a refraction prism or lens or the like.

Essentially, the scan device 65 is not a necessary component. The light source 61*a* of the irradiation device 60 may be configured so that the light source can be displaced (moved, oscillated, and rotated) with respect to the optical element 50 and so that the coherent light beams irradiated from the light source 61*a* are allowed to scan the hologram recording medium 55 according to the displacement of the light source 61a with respect to the optical element.

In addition, although the description hereinbefore is made under the presumption that the light source 61a of the irradiation device 60 oscillates a laser beam which is shaped as a linear light beam, the preset invention is not limited thereto. Particularly, in the embodiment described above, the coherent light beams irradiated on the respective positions of the optical element 50 are shaped by the optical element 50 as a light flux which is incident on the entire area of the illuminated zone LZ. Therefore, although the coherent light beams irradiated from the light source 61a of the irradiation device 60 on the optical element 50 are not accurately shaped, no problem occurs. For this reason, the coherent light beams generated from the light source 61a may be a diverging light beam. In addition, the shape of a cross section of the coherent light beam generated from the light source 61a may be an ellipse or the like instead of a circle. In addition, the transverse mode of the coherent light beam generated from the light source 61a may be a multi-mode.

In addition, in the case where the light source 61a generates the diverging light flux, when the coherent light beams are incident on the hologram recording medium 55 of the optical element 50, each of the light beams is incident on not a spot but a zone having somewhat area. In this case, the light beams which are diffracted by the hologram recording medium 55 to be incident on the respective positions of the illuminated zone LZ are multiplexed in terms of angle. In other words, in each instant, the coherent light beams are incident from the directions of certain angle ranges on the respective positions of the illuminated zone LZ. Due to the multiplexing in terms of angle, it is possible to more effectively allow the speckles to be inconspicuous.

Figure 9:
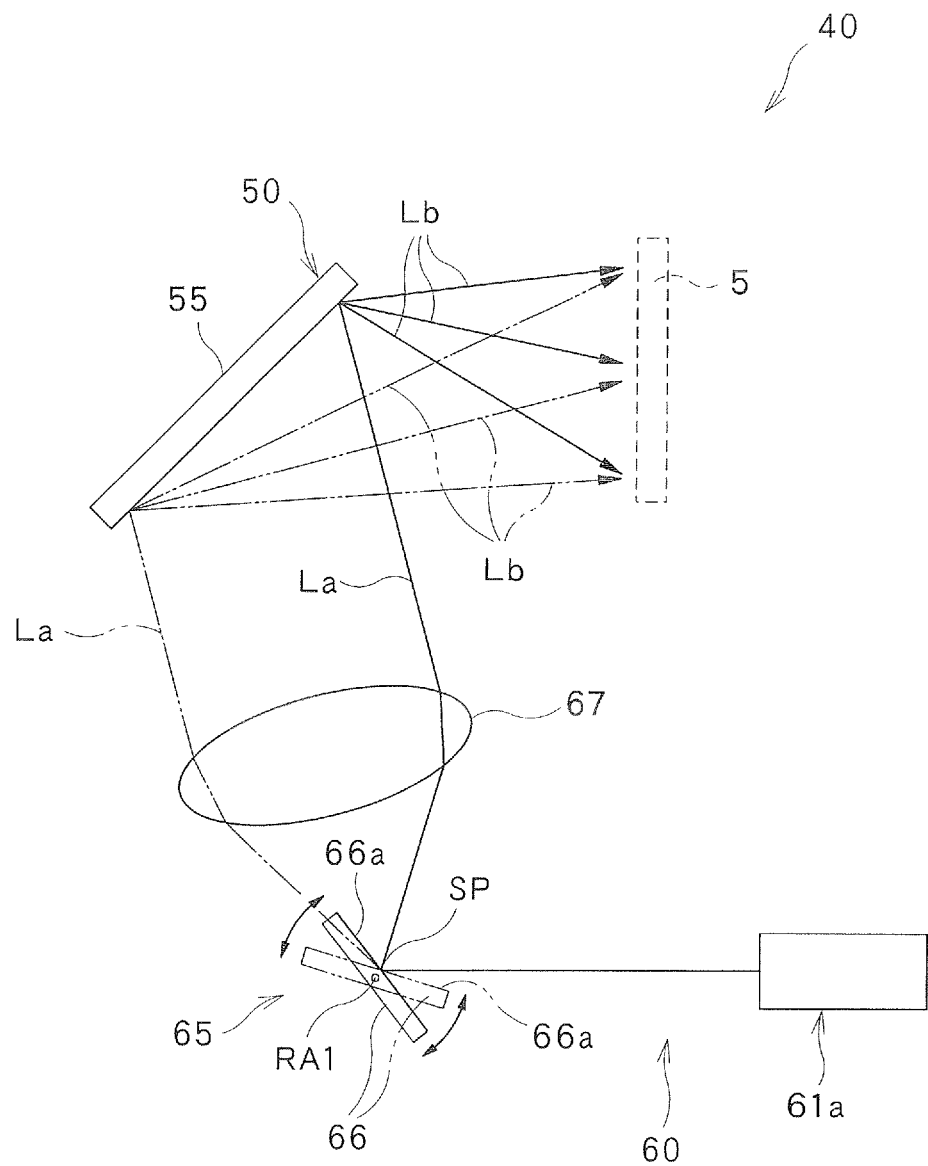
FIG. 9 is a diagram corresponding to FIG. 2 and is a perspective diagram illustrating another modified example of an irradiation device and functions thereof.

In addition, in the embodiment described above, although the example where the irradiation device 60 is configured so as to trace the optical path of the one light ray constituting the diverging light flux so that the coherent light beams are allowed to be incident on the optical element 50 is described, the present invention is not limited thereto. For example, in the embodiment described above, the scan device 65 may be configured to further include a collection lens 67 disposed at the downstream side of the mirror device 66 along the optical path of the coherent light beam. In this case, as illustrated in FIG. 9, the light beam of the mirror device 66, which travels along the optical path of the light beam constituting the diverging light flux, is allowed by the collection lens 67 to become the light beam which travels in a certain direction. In other words, the irradiation device 60 is configured so as to trace the optical path of the light beams constituting the parallel light flux, so that the coherent light beams are allowed to be incident on the optical element 50. In this example, in the exposing process during the manufacturing of the hologram recording medium 55, instead of the converging light flux described above, the parallel light flux is used as the reference light beams Lr. The hologram recording medium 55 can be more simply manufactured and replicated.

In the embodiment described above, although the example in which the irradiation device 60 is configured to include only one laser source 61a is described, the present invention is not limited thereto. For example, the irradiation device 60 may be configured to include a plurality of the light sources which oscillate light beams having the same wavelength range. In this case, the illumination device 40 can illuminate the illuminated zone LZ more brightly. In addition, the coherent light beams of other solid-state laser sources mutually have no coherency. Therefore, the multiplexing of the scattering patterns further progresses, so that it is possible to allow the speckles to be more inconspicuous.

(Optical Element)

In the embodiment described above, although the example where the optical element 50 is configured with a reflection-type volume hologram 55 using a photopolymer is described, the present invention is not limited thereto. As described above, the optical element 50 may be configured to include a plurality of the hologram recording media 55. In addition, the optical element 50 may include a type of a volume hologram where recording is performed by using a photosensitive medium including a silver halide material. In addition, the optical element 50 may include a transmission-type volume hologram recording medium, and the optical element 50 may include a relief-type (emboss-type) hologram recording medium.

With respect to the relief-type (emboss-type) hologram, hologram interference fringe is recorded by a convex-concave structure of a surface thereof. However, in the case of the relief type hologram, since scattering due to the convex-concave structure of the surface may also cause occurrence of speckles, the volume hologram is preferred in terms of this point. In the case of the volume hologram, since hologram interference fringe is recorded by using a refractive index modulation pattern (refractive index distribution) of an inner portion of the medium, there is no influence of the scattering due to the convex-concave structure of the surface.

However, even in the case of the volume hologram, if recording is performed by using a photosensitive medium including a silver halide material, scattering due to silver halide particles may also cause occurrence of speckles. Therefore, as the hologram recording medium 55, the volume hologram using a photopolymer is preferred in terms of this point.

In addition, in the exposing process illustrated in FIG. 3, although a so-called Fresnel type hologram recording medium is manufactured, a Fourier transform type hologram recording medium which can be obtained through recording using lenses may be manufactured. However, in the case of using the Fourier transform type hologram recording medium, the lenses can be used even during the image reproduction.

In addition, a striped pattern (refractive index modulation pattern or convex-concave pattern) which is to be formed on the hologram recording medium 55 may be designed by using a computer based on wavelengths or incident directions of predetermined reproduction illumination light beams La, shapes or positions of to-be-reproduced image, and the like without use of the actual object light beams Lo and the reference light beams Lr. The hologram recording medium 55 obtained in this manner is also called a computer generated hologram. In addition, similarly to the modified example described above, in the case where a plurality of the coherent light beams having mutually different wavelength ranges are irradiated from the irradiation device 60, the hologram recording medium 55 as the computer generated hologram recording medium may be configured so as to be partitioned planarly into a plurality of zones disposed corresponding to the coherent light beams having the respective wavelength ranges, and the coherent light beams having the wavelength ranges are diffracted by the corresponding zones to reproduce the image.

In addition, in the embodiment described above, although the example where the optical element 50 is configured to include the hologram recording medium 55 as a light diffusion element or a light diffusion component which spreads the coherent light beams irradiated on the respective positions thereof and illuminates the entire area of the illuminated zone LZ by using the spread coherent light beams is described, the present invention is not limited thereto. Instead of the hologram recording medium 55 or in addition to the hologram recording medium 55, the optical element 50 may be configured to include a lens array as a light diffusion element which changes the traveling directions of the coherent light beams irradiated on the respective positions and diffuses the coherent light beams to illuminate the entire area of the illuminated zone LZ with the coherent light beams. As a specific example of the lens array functioning as a light diffusion element, a total-reflection-type or refraction-type Fresnel lens added with a diffusion function, a fly-eye lens, or the like may be exemplified. In the illumination device 40, the irradiation device 60 and the optical element 50 may also be configured so that the irradiation device 60 allows the coherent light beams to scan the light diffusion element including the lens array to irradiate the optical element 50 with the coherent light beams and so that the traveling directions of the coherent light beams incident from the irradiation device 60 on the respective positions of the optical element 50 are changed by the lens array as a light diffusion element to illuminate the illuminated zone LZ with the coherent light beams. Therefore, it is possible to effectively allow the speckles to be inconspicuous.

(Illuminating Method)

In the embodiment described above, as an example, the irradiation device 60 is configured so as to allow the coherent light beams to scan the optical element 50 in one-dimensional direction, and the light diffusion element 55 which is configured with the hologram recording medium, the lens array, or the like of the optical element 50 is configured so as to diffuse (spread, diverge) the coherent light beams irradiated on the respective positions in two-dimensional directions, so that the illumination device 40 may illuminate the two-dimensional illuminated zone LZ. However, as described above, the present invention is not limited to. For example, the irradiation device 60 may be configured so as to scan the optical element 50 with the coherent light beams in two-dimensional directions and the light diffusion element 55 which is configured with the hologram recording medium 55, the lens array, or the like of the optical element 50 may be configured so as to diffuse (spread, diverge) the coherent light beams irradiated on the respective positions in two-dimensional directions, so that the illumination device 40 may illuminate the two-dimensional illuminated zone LZ (described above with reference to FIG. 8)

In addition, as described above, the irradiation device 60 may be configured so as to scan the optical element 50 with the coherent light beams in one-dimensional direction, and the light diffusion element 55 which is configured with the hologram recording medium, the lens array, or the like of the optical element 50 may be configured so as to diffuse (spread, diverge) the coherent light beams irradiated on the respective positions in one-dimensional direction, so that the illumination device 40 may illuminate the one-dimensional illuminated zone LZ. In the embodiment, the scan direction of the coherent light beams by the irradiation device 60 and the diffusion direction (spread direction) of the light diffusion element 55 which is configured with the hologram recording medium, the lens array, or the like of the optical element may be set to be parallel to each other.

In addition, the irradiation device 60 may be configured so as to scan the optical element 50 with the coherent light beams in one-dimensional direction or in two-dimensional directions, and the light diffusion element 55 which is configured with the hologram recording medium 55, the lens array, or the like of the optical element 50 may be configured so as to diffuse (spread, diverge) the coherent light beams irradiated on the respective positions in one-dimensional direction. In the embodiment, as described above, the optical element 50 may be configured to include a plurality of light diffusion elements 55 to sequentially illuminate the illuminated zones LZ corresponding to the light diffusion elements 55, so that the illumination device 40 may illuminate two-dimensional zone. In this case, the illuminated zones LZ may be sequentially illuminated at such a speed that it is recognized by human eyes that the illuminated zones LZ are simultaneously illuminated, or the illuminated zones LZ may be sequentially illuminated at such a low speed that it is recognized by human eyes that the illuminated zones LZ are sequentially illuminated.

(Combination of Modified Examples)

In addition, although several modified examples of the basic embodiments are described hereinbefore, it is obvious that a combination of a plurality of the modified examples is available.

<Applied Form>

[Configuration and Functions of Applied Form]

Next, in an applied form configured by applying the basic embodiment described above will be described with reference to the illumination device 40, the projection device 20, and the projection-type image display device 10 illustrated in FIG. 10. In the description hereinafter, only the components added to the basic embodiment described above will be described. The other components having the same configurations as those of the basic embodiment described above are denoted by the same reference numerals in FIG. 10, and the redundant description thereof is not repeated.

In the basic embodiment described above, the example where the irradiation device 60 is configured to include only the single light source 61a generating a coherent light beam is described. The coherent light beam generated from the single light source 61a is typically a monochromatic light beam which is a light beam in a narrow wavelength band as typified by a laser beam. In addition, the coherent light beam which is generated by a practically available light source, that is, a light source which can be available with low cost and have sufficient output power is limited to a light beam having a specific wavelength (range). In other words, light beams in various colors may not be displayed by the light beam of the single light source. On the other hand, at present, in many cases, it is preferred that the illuminated zone is illuminated or an image is displayed in desired color, in plural colors, typically in full color which may not be displayed by the single light source. The form illustrated in FIG. 10 is configured by applying the basic embodiment described above by taking into consideration these points.

In the applied form, the irradiation device 60 is configured to illuminate the optical element 50 with a combined light beam SL which is formed by combining a plurality of coherent light beams having mutually different wavelength ranges. In the example illustrated in FIG. 10, the irradiation device 60 illuminates a combined light beam SL which are formed by combining first coherent light beams La having a first wavelength range, second coherent light beams Lb having a second wavelength range different from the first wavelength range, and third coherent light beams Lc having a third wavelength range different from both of the first and second wavelength ranges. Particularly, hereinafter, the first wavelength range corresponds to a first primary color component (for example, a red component); the second wavelength range corresponds to a second primary color component (for example, a green component); the third wavelength range corresponds to a third primary color component (for example, a blue component); and an example where the irradiation device 60 performs illumination with a white light beam through additive color mixture of first to third primary color components will be described.

Figure 10:
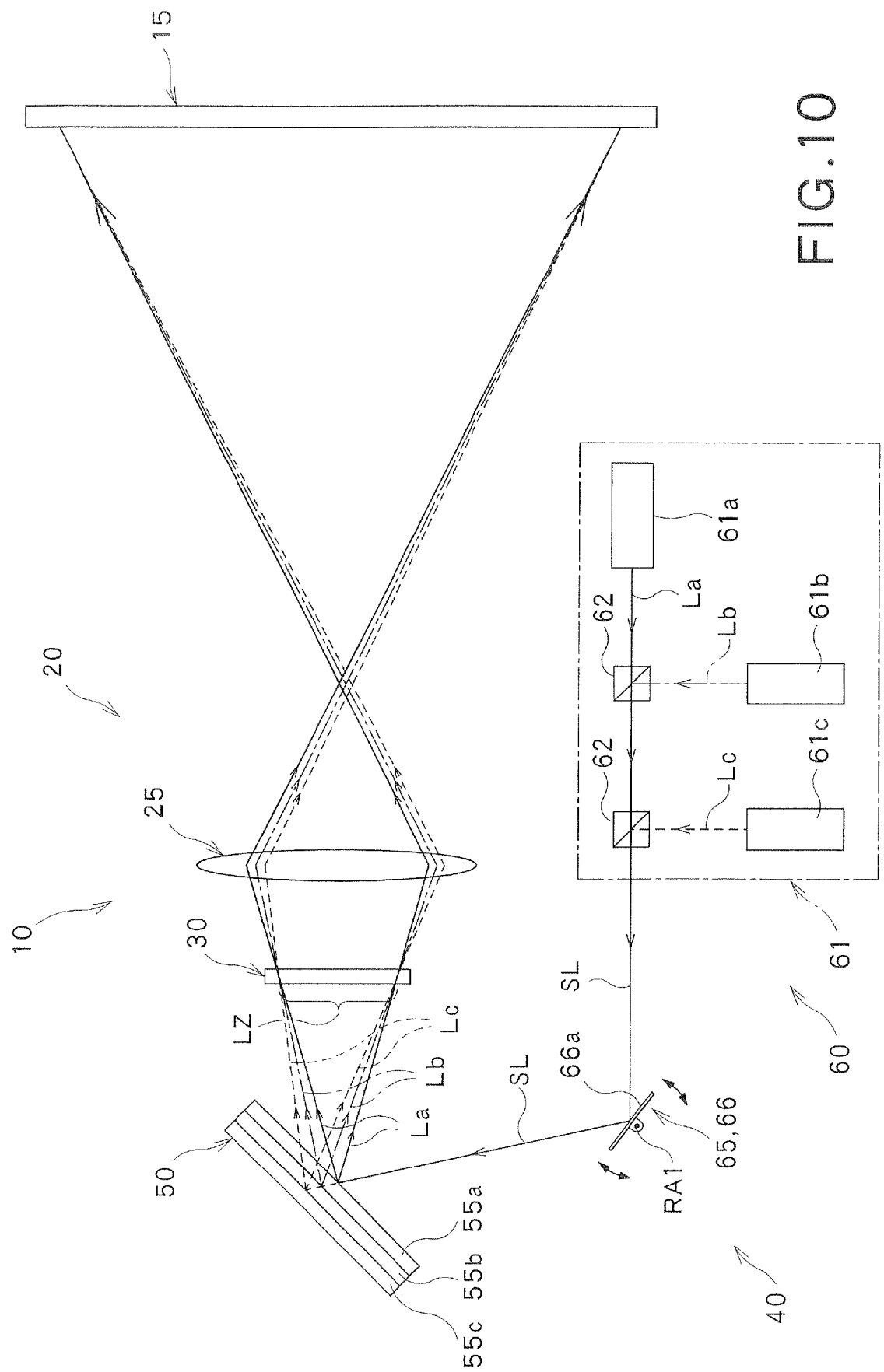
FIG. 10 is a diagram illustrating an applied form as an application of a basic form according to an embodiment of the present invention and illustrating schematic configurations of an illumination device, a projection device, and a projection-type image display device as a specific example of the applied form.

In the example illustrated in FIG. 10, the irradiation device 60 is configured to include the scan device 65 described above and a light source system 61 which generates the combined light beam (synthetic light beam) SL. The light source system 61 is configured to include a plurality of light sources 61a, 61b, and 61c each of which oscillates a coherent light beam having a wavelength range corresponding to a wavelength range of each of coherent light beams and a combining device 62 which combines the coherent light beams from the plurality of light sources 61a, 61b, and 61c. The light source system 61 includes, as a plurality of light sources, a first light source 61a which oscillates a first coherent light beam La having a first wavelength range, a second light source 61b which oscillates a second coherent light beam Lb having a second wavelength range, and a third light source 61c which oscillates a third coherent light beam Lc having a third wavelength range. On the other hand, various members, parts, and devices which combine two light beams may be used as the combining device 62. In the example illustrated, a semi-transparent mirror having advantages of low cost and small size in comparison with a cross dichroic prism and the like is used as the combining device 62.

In the example illustrated in FIG. 10, the optical element 50 is configured to include a hologram recording medium 55 which is configured with a reflection-type volume hologram which diffracts the combined light beam to illuminate the illuminated zone LZ. However, the reflection-type volume hologram has strong wavelength selectivity. Therefore, the optical element 50 illustrated is configured to include first to third hologram elements 55a, 55b, and 55c which are provided corresponding to the coherent light beams having the respective wavelength ranges. The first hologram element 55a is provided corresponding to the first coherent light beam La having the first wavelength range; the second hologram element 55b is provided corresponding to the second coherent light beam Lb having the second wavelength range; and the third hologram element 55c is provided corresponding to the third coherent light beam Lc having the third wavelength range.

Each of the first to third hologram elements 55a, 55b, and 55c can reproduce the image 5 of the scattering plate 6. Particularly, the first hologram element 55a diffracts the first coherent light beams La having the first wavelength range as a reproduction illumination light beam; and second hologram element 55b diffracts the second coherent light beam Lb having the second wavelength range as a reproduction illumination light beam; and the third hologram element 55c diffracts the third coherent light beam Lc having the third wavelength range as a reproduction illumination light beam, so that mutually the same images 5 of the scattering plate 6 can be reproduced.

In addition, the hologram elements 55a, 55b, and 55c for the coherent light beams having the respective wavelength ranges may be manufactured so that, for example, in the method described above with reference to FIGS. 3 and 4, the coherent light beams having the corresponding wavelength ranges are used as exposure light beams (reference light beams Lr and object light beams Lo).

As illustrated in FIG. 10, the first to third hologram elements 55a, 55b, and 55c are configured to laminate each other. In addition, similarly to the basic embodiment described above, in the case where the irradiation device 60 irradiates the optical element 50 with the combined light beam SL, the combined light beam SL is allowed to scan the hologram recording medium 55. As a result, at least the first coherent light beam La of the combined light beam SL is allowed to scan the first hologram element 55a; at least the second coherent light beam Lb of the combined light beam SL is allowed to scan the second hologram element 55b; and at least the third coherent light beam Lc of the combined light beam SL is allowed to scan the third hologram element 55c. Therefore, the optical element 50 and the irradiation device 60 are positioned such that the first coherent light beam La of the combined light beam SL incident from the irradiation device 60 on the respective positions of the hologram recording medium 55 reproduces the image 5 superimposed on the illuminated zone LZ; the second coherent light beam Lb in the combined light beam SL incident from the irradiation device 60 on the respective positions of the hologram recording medium 55 reproduces the image 5 superimposed on the illuminated zone LZ; and the third coherent light beam Lc in the combined light beam SL incident from the irradiation device 60 on the respective positions of the hologram recording medium 55 reproduces the image 5 superimposed on the illuminated zone LZ.

In the applied form illustrated in FIG. 10, when the combined light beam SL is incident from the irradiation device 60 on the optical element 50, the coherent light beams (first to third coherent light beams) La, Lb, and Lc having the respective wavelength ranges constituting the combined light beam are allowed to reproduce the images 5 of the scattering plate 6 superimposed on the illuminated zone LZ. As a result, the illuminated zone LZ is illuminated with a color which is obtained through additive color mixture of the first to third coherent light beams La, Lb, and Lc. In other words, in the example, the illumination device 60 illuminates the illuminated zone LZ with a white light beam.

In addition, in the projection device 20 or the transmission-type image display device 10, in the case where the spatial light modulator 30 is configured to include, for example, a color filter so that modulation images corresponding to the coherent light beams La, Lb, and Lc having the respective wavelength ranges can be formed, it is possible to display an image in plural colors and furthermore to display an image in full color. In addition, although the spatial light modulator does not include a color filter, the irradiation device 60 may be configured so as to perform sequential irradiation of the coherent light beams La, Lb, and Lc having the respective wavelength ranges in a time division manner, that is, to perform sequential irradiation of the coherent light beams La, Lb, and Lc in units of an infinitesimal time, and the spatial light modulator 30 may be configured to be operated in a time division manner so as to form modulation images corresponding to the illuminated coherent light beams having the wavelength ranges. In this example, if the time division operations is performed at such a high speed that the operation may not be detected by human eyes, in the case of the observation with human eyes, it is possible to display an image in plural colors and furthermore to display an image in full color.

In addition, according to the applied form illustrated in FIG. 10, similarly to the basic embodiment described above, the incident directions of the coherent light beams La, Lb, and Lc, which are diffracted by the hologram elements 55a, 55b, and 55c of the optical element 50 incident on the respective positions of the illuminated zone LZ are continuously changed. Accordingly, the incident directions of the image light beams including the first to third coherent light beams La, Lb, and Lc projected from the projection device 20, which are incident on the respective positions of the screen 15, are continuously changed. Therefore, as described above in the basic embodiment, the speckle patterns having no correlation are superimposed each other to be averaged, so that it is possible to allow the speckles observed with observer's eyes to be inconspicuous.

In addition, in the form illustrated in FIG. 10, the first to third coherent light beams La, Lb, and Lc are allowed to be simultaneously illuminated on the illuminated zone LZ and to be simultaneously projected on the screen 15. Since the first to third coherent light beams La, Lb, and Lc are generated by mutually different light sources 61a, 61b, and 61c, the first to third coherent light beams La, Lb, and Lc have no coherency to each other. In other words, the speckle patterns originated from the respective coherent light beams La, Lb, and Lc have no correlation, and the speckle patterns having no correlation are superimposed each other on the screen 15 to be averaged. Therefore, in the applied form illustrated in FIG. 10, it is possible to allow the speckle patterns to be more inconspicuous.

[Modifications of Applied Form]

Various modifications may be made with respect to the applied form described with reference to the specific example illustrated in FIG. 10. Hereinafter, an example of changes (modifications) will be described.

As described above in the modified example of the basic embodiment, the example where the hologram recording medium 55 of the optical element 50 is configured in a state where a plurality of the hologram elements 55a, 55b, and 55c configured with a reflection-type volume hologram are laminated is described, the present invention is not limited thereto.

For example, each of the hologram elements 55a, 55b, and 55c may be configured with a transmission-type volume hologram. In addition, the transmission-type volume hologram has weak wavelength selectivity in comparison with a reflection-type volume hologram. However, the wavelength selectivity of the transmission-type volume hologram may be adjusted by allowing, for example, a thickness of the hologram photosensitive material 58 to be large. By adjusting the wavelength selectivity of the transmission-type volume hologram, each transmission-type volume hologram diffracts only the targeted coherent light beam having the wavelength range with high efficiency, so that it is possible to prevent the path of the non-targeted coherent light beam having the wavelength range from being greatly displaced.

In addition, in the example illustrated in FIG. 10, the example where the first to third hologram elements 55a, 55b, and 55c which are provided corresponding to the first to third coherent light beams La, Lb, and Lc constituting the combined light beam SL are laminated to constitute one hologram recording medium 55 is described. However, instead of manufacturing the hologram recording medium 55 by laminating the first to third hologram elements 55a, 55b, and 55c, the first to third hologram elements 55a, 55b, and 55c may be arranged side by side on one plane so as to constitute one hologram recording medium 55. In other words, the hologram recording medium 55 may be partitioned planarly into a plurality of zones which are provided corresponding to the coherent light beams having the respective wavelength ranges, so that the coherent light beams having the wavelength ranges are diffracted by the corresponding zones to reproduce the images.

In this example, at the moment, in the combined light beam SL which is allowed to scan the hologram recording medium 55 of the optical element 50, only the coherent light beam corresponding to any one of the wavelength ranges is allowed to illuminate the illuminated zone LZ (or the spatial light modulator 30) with the coherent light beam. The spatial light modulator 30 may be configured to include a color filter and to be operated to always form the modulation images corresponding to the coherent light beams La, Lb, and Lc having the respective wavelength ranges, or to be operated in a time division manner so as to form the modulation images corresponding to the coherent light beams having the wavelength ranges which are allowed to illuminate the spatial light modulator 30. In addition, as described above, the frequency of the scan device 65 such as a MEMS mirror or a polygon mirror which is actually commercially available is typically several hundred Hz or more, and in some cases, the frequency of the scan device 65 may be several tens of thousands of Hz. In this manner, if the scanning of the combined light beam SL is performed at a very high speed, human eyes may not recognize a change in color of the light beam which is allowed to illuminate the illuminated zone LZ (or the spatial light modulator 30), but it is recognized that the illuminated zone LZ (or the spatial light modulator 30) is illuminated with the combined light beam so that an image is displayed by the combined light beam.

In addition, in the example illustrated in FIG. 10, the first to third hologram elements 55a, 55b, and 55c are provided corresponding to the first to third coherent light beams La, Lb, and Lc constituting the combined light beam SL. However, instead of manufacturing the hologram recording medium 55 by laminating the first to third hologram elements 55a, 55b, and 55c, a single hologram photosensitive material 58 may be exposed to the object light beams Lo and the reference light beams Lr which include the coherent light beams having the respective wavelength ranges simultaneously or at different timings, so that a plurality of the light beams having the wavelength ranges may be diffracted by the single hologram recording medium 55.

In addition, as displayed by a laser beam, coherent light beams having different wavelength ranges are generated by different laser sources and have no coherency with each other. Therefore, although the hologram photosensitive material 58 is exposed to the coherent light beams having different wavelength ranges simultaneously, interference fringe between the coherent light beams having different wavelength ranges is not generated. In other words, interference fringe which is unnecessary for the hologram photosensitive material 58 is not recorded, and the hologram recording medium 55 configured with the hologram photosensitive material 58 may diffract a plurality of the coherent light beams having mutually different wavelength ranges with high efficiency, respectively.

In addition, with respect to a striped pattern (refractive index modulation pattern or convex-concave pattern) which is to be formed on the hologram recording medium 55, a hologram (so-called computer generated hologram) which is designed by using a computer based on wavelengths or incident directions of predetermined reproduction illumination light beams and shapes or positions of to-be-reproduced images, and the like without use of the actual object light beams Lo and reference light beams Lr may be used as the hologram recording medium 55. The hologram recording medium 55 as the computer generated hologram may be partitioned planarly into a plurality of zones which are provided corresponding to the coherent light beams having the respective wavelength ranges, so that the coherent light beams having the respective wavelength ranges are diffracted by the corresponding zones to reproduce the images.

In addition, as described in the modified example of the basic embodiment, instead of the hologram recording medium 55 or in addition to the hologram recording medium 55, the optical element 50 may be configured to include a lens array as the light diffusion element 55 which changes the traveling directions of the coherent light beams irradiated on the respective positions and diffuses the coherent light beams to illuminate the entire area of the illuminated zone LZ with the coherent light beams. More specifically, in the case where the optical element 50 is configured to include the lens array, the combined light beam SL which is formed by combining a plurality of the coherent light beams having different wavelength ranges is not subjected to optical operations of the optical element 50 according to each of the coherent light beams, but the traveling direction thereof is changed by the lens array without separation thereof according to each of the coherent light beams. In other words, the traveling direction of the combined light beam SL incident from the irradiation device 60 on the respective positions of the lens array of the optical element 50 is changed by the lens array to illuminate the illuminated zone LZ with the combined light beam SL.

In addition, in the example described above, the example where the combined light beam SL formed by combining the first to third coherent light beams La, Lb, and Lc having three mutually different wavelength ranges is irradiated from the irradiation device 60 and each of the first to third coherent light beams La, Lb, and Lc having the respective wavelength ranges is a primary color component for displaying white is described. However, each of the first to third coherent light beams La, Lb, and Lc having the respective wavelength ranges does not need to be a primary color component for displaying white. In addition, the combined light beam SL does not need to be formed by combining the coherent light beams having three mutually different wavelength ranges. For example, the combined light beam SL may be formed by combining coherent light beams having two mutually different wavelength ranges. In this case, it is possible to illuminate the illuminated zone with color which may not be displayed generally by a coherent light beam from a single light source. In addition, it is possible to display an image in color which may not be displayed generally by a coherent light beam from a single light source, or it is possible to display an image in plural colors.

In addition, as described above in the modified example of the basic embodiment, the irradiation device 60 may irradiate the optical element 50 with the combined light beam SL along an optical path of one light ray of a virtual parallel light flux. In other words, the irradiation device 60 may irradiate the respective positions of the hologram recording medium 55 of the optical element 50 with the combined light beam SL which travels in a certain direction. As a specific configuration, as illustrated in FIG. 9, in addition to the reflection device 66 described above, the scan device 65 may be configured to further include a lens 67 as a collimator which deflects the traveling direction of the light beam reflected by the reflection device 66 to a certain direction. Herein, since the combined light beam SL formed by combining a plurality of the coherent light beams La, Lb, and Lc having different wavelength ranges is incident on the lens 67, it is preferable that, in terms of prevention of a problem of color diffusion or the like, achromatic lens is used as the lens 67.

The invention claimed is:

1. An illumination device comprising:
   an optical element including a hologram recording medium which records an image of a scattering plate and diffracts a first coherent light beam having a first wavelength range and a second coherent light beam having a second wavelength range which is different from the first wavelength range so as to reproduce the image of the scattering plate; and
   an irradiation device configured to irradiate the optical element with light beams having different wavelength ranges so as to allow the first coherent light beam and the second coherent light beam to scan the hologram recording medium,
   wherein the irradiation device and the optical element are arranged such that the first coherent light beams incident from the irradiation device on respective positions of the hologram recording medium are diffracted by the hologram recording medium and reproduce the images of the scattering plate superimposed on a zone, and the second coherent light beams incident from the irradiation device on respective positions of the hologram recording medium are diffracted by the hologram recording medium and reproduce the images of the scattering plate superimposed on the zone so as to illuminate the zone with reproduction light beams which reproduce the images of the scattering plate.

2. The illumination device according to claim 1,
   wherein the hologram recording medium is configured to diffract a third coherent light beam having a third wavelength range different from both of the first wavelength range and the second wavelength range so as to reproduce the image of the scattering plate,
   wherein the coherent light beams having different wavelength ranges irradiated from the irradiation device further includes the third coherent light beam,
   wherein the irradiation device and the optical element are arranged such that the third coherent light beams incident from the irradiation device on respective positions of the hologram recording medium are diffracted by the hologram recording medium and reproduce the images of the scattering plate superimposed on the zone, and
   wherein the first wavelength range corresponds to a first primary color component, the second wavelength range corresponds to a second primary color component, and the third wavelength range corresponds to a third primary color component.

3. The illumination device according to claim 1,
   wherein the hologram recording medium includes a plurality of laminated hologram elements which are provided corresponding to the coherent light beams having the respective wavelength ranges.

4. The illumination device according to claim 1,
   wherein the coherent light beams having different wavelength ranges are irradiated in a same optical path from the irradiation device on the optical element.

5. The illumination device according to claim 1,
   wherein the irradiation device includes a light source system which generates a combined light beam formed by combining the coherent light beams having different wavelength ranges and a scan device configured to change a traveling direction of the combined light beam from the light source system to allow the combined light beam to scan the optical element.

6. The illumination device according to claim 5,
   wherein the light source system includes light sources which generate the coherent light beams having respective wavelength ranges and a combining device which combines the coherent light beams from the light sources.

7. The illumination device according to claim 1,
   wherein the irradiation device irradiates the optical element with the coherent light beams having different wavelength ranges in a time division manner.

8. The illumination device according to claim 1, wherein
the image of the scattering plate was recorded in the hologram recording medium by using a reference light beam which was irradiated along a given path, and
the irradiation device is configured to irradiate the hologram recording medium with the coherent light beams having different wavelength ranges such that the incidence directions of the first and second coherent light beams on respective positions of the hologram recording medium are along a traveling direction of the reference light beam.

9. A projection device comprising:
the illumination device according to claim 1; and
a spatial light modulator positioned at a position which overlaps the zone on which the image of the scattering plate is to be reproduced and superimposed.

10. The projection device according to claim 9, further comprising a projection optical system configured to project a modulation image obtained on the spatial light modulator on a screen.

11. A projection-type image display device comprising:
the projection device according to claim 9; and
a screen on which a modulation image obtained on the spatial light modulator is projected.

12. A projection-type image display device comprising:
the illumination device according to claim 1;
a screen positioned at a position which overlaps the zone on which the image of the scattering plate is to be reproduced and superimposed.

\* \* \* \* \*